United States Patent
Kasugai et al.

(10) Patent No.: US 11,838,668 B2
(45) Date of Patent: Dec. 5, 2023

(54) PHOTOELECTRIC CONVERSION DEVICE

(71) Applicant: CANON KABUSHIKI KAISHA, Tokyo (JP)

(72) Inventors: Taichi Kasugai, Kanagawa (JP); Shintaro Takenaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 17/729,731

(22) Filed: Apr. 26, 2022

(65) Prior Publication Data
US 2022/0353450 A1 Nov. 3, 2022

(30) Foreign Application Priority Data

Apr. 28, 2021 (JP) ................................. 2021-076563

(51) Int. Cl.
*H04N 25/768* (2023.01)
*H04N 25/767* (2023.01)
*H04N 25/772* (2023.01)

(52) U.S. Cl.
CPC ......... *H04N 25/768* (2023.01); *H04N 25/767* (2023.01); *H04N 25/772* (2023.01)

(58) Field of Classification Search
CPC ............... H04N 25/768; H04N 25/767; H04N 25/772; H04N 25/745; H04N 25/778; H04N 25/531
USPC .................................................... 348/207.99
See application file for complete search history.

(56) References Cited

U.S. PATENT DOCUMENTS

| 7,999,866 | B2 | 8/2011 | Sonoda |
| 8,040,417 | B2 * | 10/2011 | Asahi ................... H04N 23/665 348/308 |
| 8,049,799 | B2 | 11/2011 | Sonoda |
| 8,081,246 | B2 | 12/2011 | Takenaka |
| 8,305,473 | B2 | 11/2012 | Takenaka |
| 8,363,137 | B2 | 1/2013 | Sonoda |
| 8,466,994 | B2 | 6/2013 | Takenaka |
| 8,670,058 | B2 | 3/2014 | Hayashi |

(Continued)

FOREIGN PATENT DOCUMENTS

| JP | 2008-288946 A | 11/2008 |
| JP | 2013-48383 A | 3/2013 |

(Continued)

*Primary Examiner* — Lin Ye
*Assistant Examiner* — Chan T Nguyen
(74) *Attorney, Agent, or Firm* — VENABLE LLP

(57) ABSTRACT

The photoelectric conversion device includes pixels each including photoelectric converters and a floating diffusion to which charges of the photoelectric converters are transferred, a vertical scanning unit for performing readout processing and reset processing on the pixels while switching the photoelectric converter to be processed and the floating diffusion to be processed, and a control unit that controls the vertical scanning unit. The control unit includes a readout row address generation unit and a reset row address generation unit that generate a row address to be processed. A first cycle in which the photoelectric converter is switched is shorter than a second cycle in which the floating diffusion is switched, an update cycle of the row address is equal to the second cycle, and a setting unit of an update timing of the row address is equal to the length of one cycle of the first cycle.

14 Claims, 30 Drawing Sheets

(56) References Cited

U.S. PATENT DOCUMENTS

| | | | |
|---|---|---|---|
| 9,654,697 | B2 | 5/2017 | Takenaka |
| 9,843,752 | B2 | 12/2017 | Yamamoto |
| 10,277,839 | B2 | 4/2019 | Takenaka |
| 10,547,794 | B2 | 1/2020 | Takenaka |
| 10,750,103 | B2 | 8/2020 | Takenaka |
| 11,202,023 | B2 | 12/2021 | Shigiya |
| 11,303,829 | B2 | 4/2022 | Shigiya |
| 2008/0284883 | A1 | 11/2008 | Asahi |
| 2011/0267513 | A1 | 11/2011 | Sonoda |
| 2012/0013778 | A1 | 1/2012 | Sonoda |
| 2013/0050551 | A1 | 2/2013 | Ichikawa |
| 2015/0129744 | A1 | 5/2015 | Sonoda |
| 2016/0227143 | A1 | 8/2016 | Kitamori et al. |
| 2018/0332276 | A1* | 11/2018 | Hayashi ................. H04N 25/74 |
| 2020/0162683 | A1* | 5/2020 | Rotte ................... H04N 25/767 |
| 2021/0051286 | A1 | 2/2021 | Kasugai |
| 2021/0176421 | A1 | 6/2021 | Shikina |
| 2022/0086383 | A1 | 3/2022 | Shigiya |

FOREIGN PATENT DOCUMENTS

| | | |
|---|---|---|
| JP | 2013-118698 A | 6/2013 |
| JP | 2016-143952 A | 8/2016 |
| JP | 2021-44623 A | 3/2021 |

\* cited by examiner

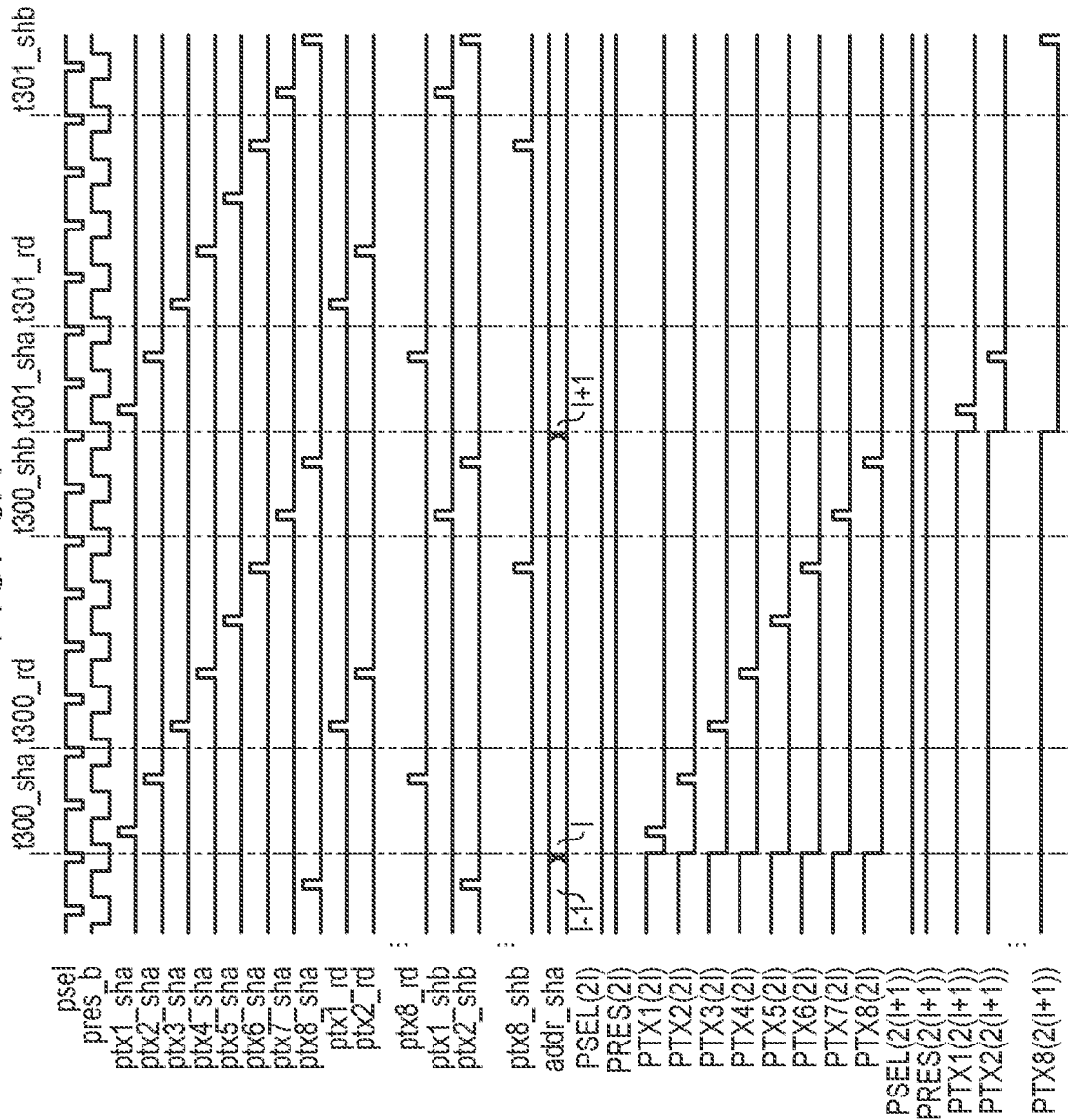

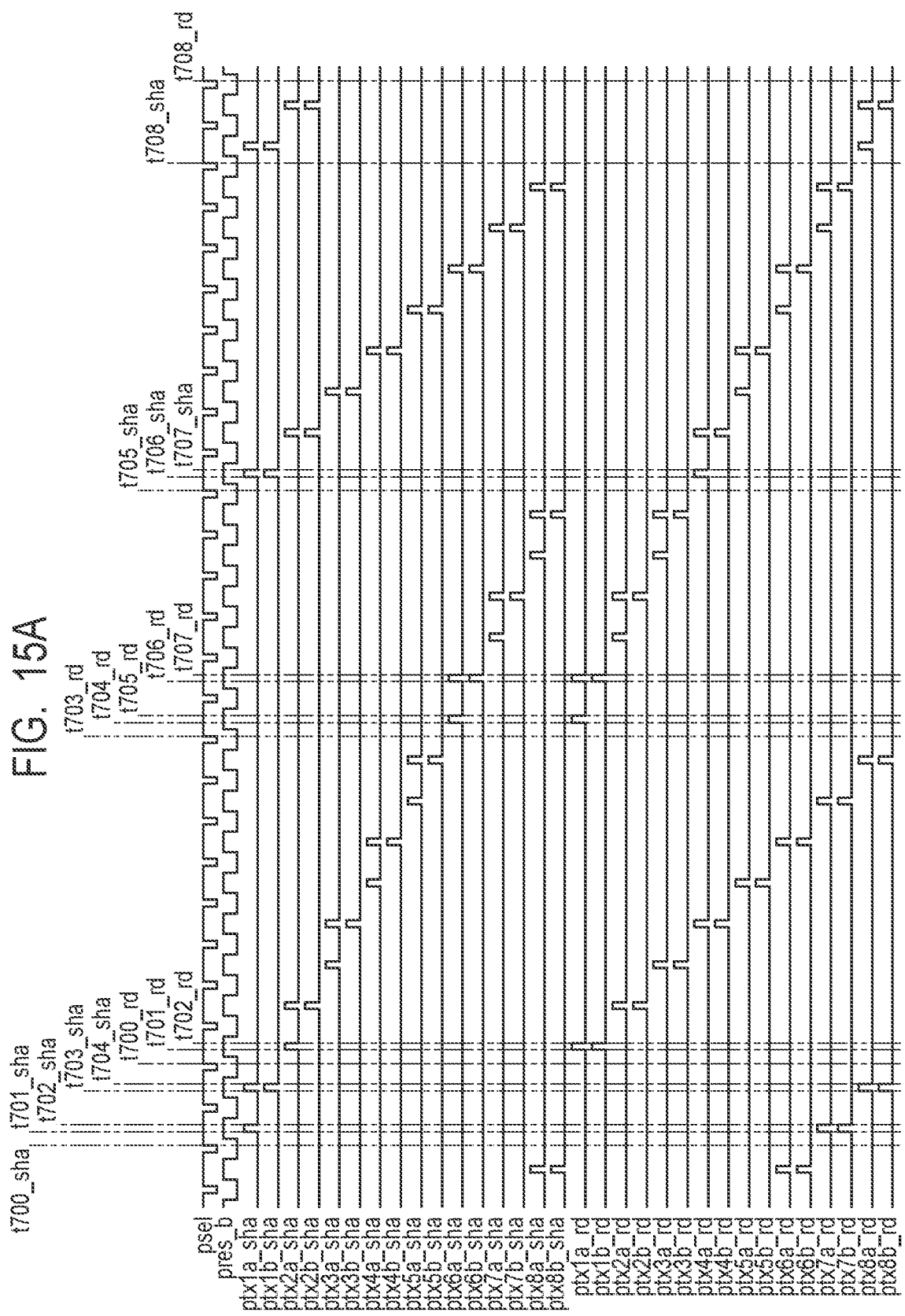

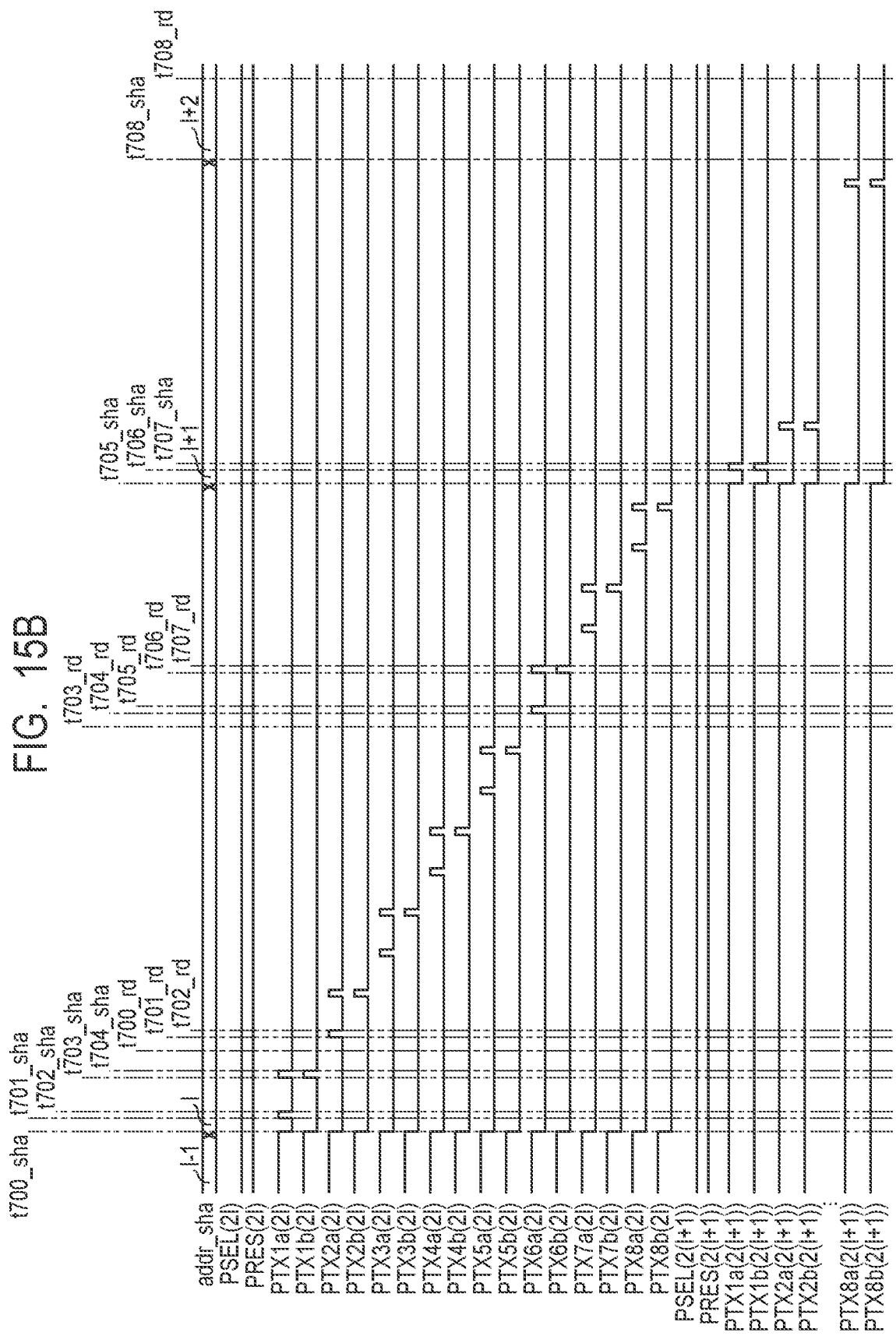

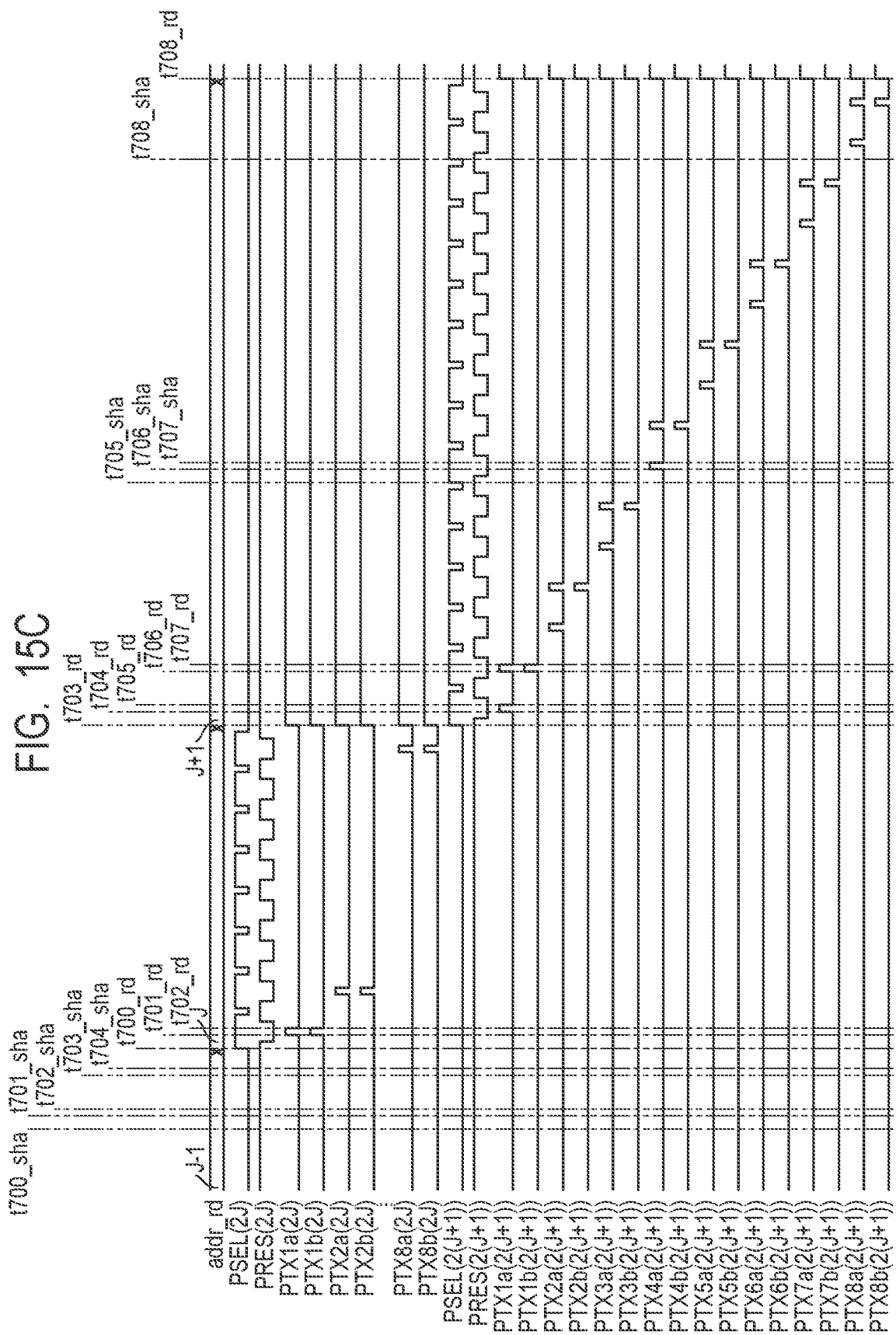

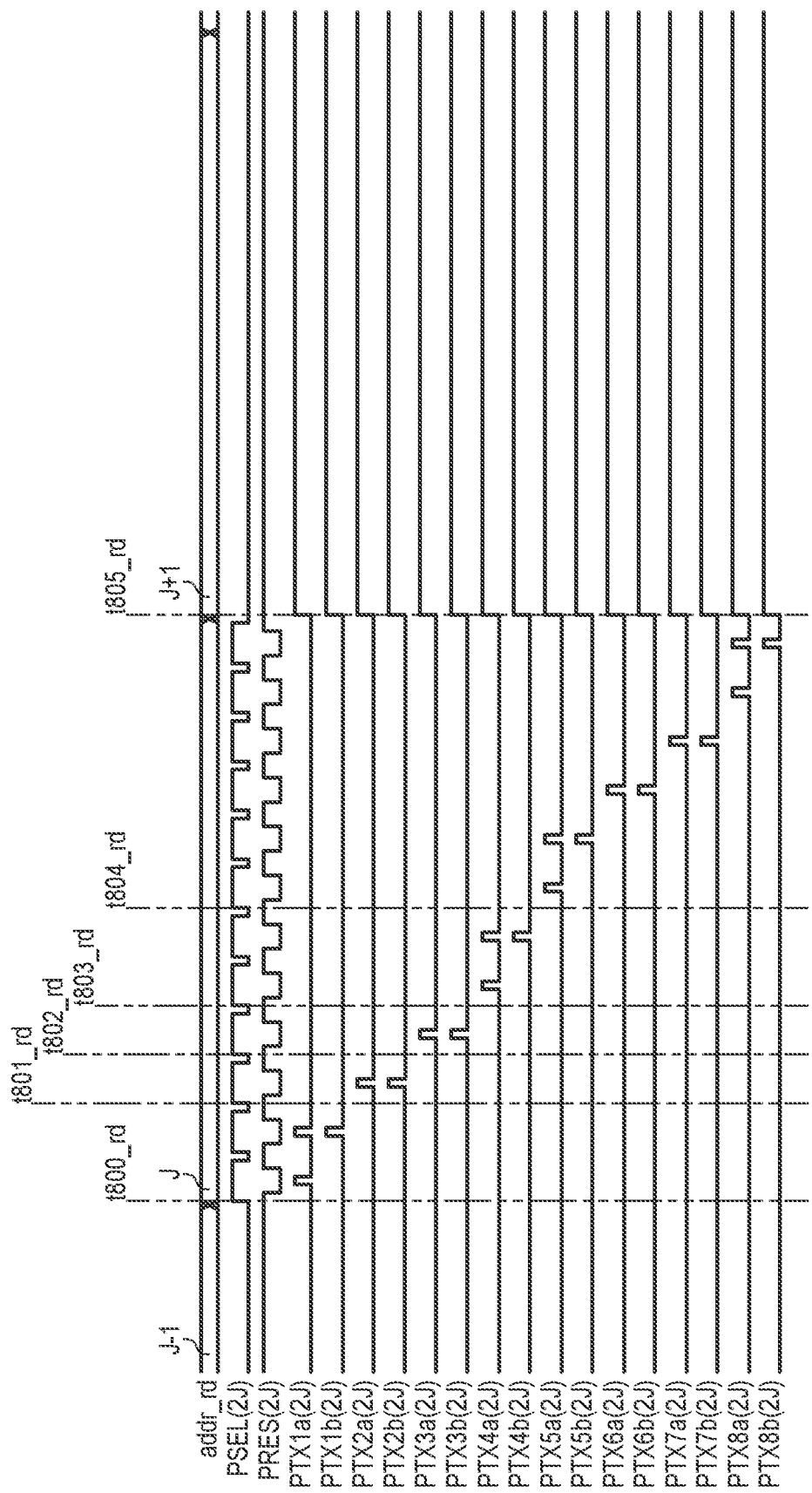

US 11,838,668 B2

PHOTOELECTRIC CONVERSION DEVICE

BACKGROUND OF THE INVENTION

Field of the Invention

The present invention relates to a photoelectric conversion device.

Description of the Related Art

Japanese Patent Application Laid-Open No. 2013-118698 discloses an image sensor including pixels in which a plurality of photoelectric converters shares one floating diffusion. Japanese Patent Application Laid-Open No. 2008-288946 discloses a method in which pixels on which each process is to be performed are specified one line at a time and each process is performed as a method of reading out charge from a photoelectric converter and resetting the photoelectric converter in a general imaging device.

When the technique described in Japanese Patent Application Laid-Open No. 2008-288946 is applied to Japanese Patent Application Laid-Open No. 2013-118698, while one floating diffusion is selected over a plurality of horizontal periods, a plurality of photoelectric converters sharing the floating diffusion are sequentially selected, and readout processing and reset processing are sequentially performed in row units. Therefore, the degree of freedom in setting the exposure time of the photoelectric converter is not necessarily high.

SUMMARY OF THE INVENTION

An object of the present invention is to provide a technique for improving a degree of freedom in setting an exposure time in a photoelectric conversion device including a pixel including a plurality of photoelectric converters sharing one floating diffusion.

According to an embodiment of the present disclosure, there is provided a photoelectric conversion device including a pixel unit in which a plurality of pixels each including three or more photoelectric converters, a floating diffusion to which charges of the plurality of photoelectric converters are transferred, and an output unit that outputs a signal corresponding to a voltage of the floating diffusion are arranged so as to form a plurality of rows and a plurality of columns, a vertical scanning unit that performs a readout processing for reading out a signal of the pixel and a reset processing for resetting the pixel on the plurality of pixels arranged in the pixel unit while switching the photoelectric converter to be processed and the floating diffusion to be processed, and a control unit configured to control the vertical scanning unit, wherein the control unit includes a readout row address generation unit that generates a row address of a pixel from which a signal is readout during the readout processing and outputs the row address to the vertical scanning unit, and a reset row address generation unit that generates a row address of a pixel to be reset during the reset processing and outputs the row address to the vertical scanning unit, wherein a first cycle, which is a cycle in which the photoelectric converter to be processed is switched during the readout processing and the reset processing, is shorter than a second cycle, which is a cycle in which the floating diffusion to be processed is switched during the readout processing and the reset processing, wherein each of an update cycle of the row address in the readout row address generation unit and an update cycle of the row address in the reset row address generation unit is equal to the second cycle, and wherein each of a setting unit of an update timing of the row address in the readout row address generation unit and a setting unit of an update timing of the row address in the reset row address generation unit is equal to a length of one cycle of the first cycle.

Further features of the present invention will become apparent from the following description of exemplary embodiments with reference to the attached drawings.

BRIEF DESCRIPTION OF THE DRAWINGS

FIG. 8A, FIG. 8B, and FIG. 8C are timing charts illustrating an operation example of a pixel control signal generation unit and a pixel unit in the photoelectric conversion device according to the first embodiment of the present invention.

FIG. 15A, FIG. 15B, and FIG. 15C are timing charts illustrating an operation example of a pixel control signal generation unit and a pixel unit in the photoelectric conversion device according to the third embodiment of the present invention.

FIG. 18A, FIG. 18B, and FIG. 18C are timing charts illustrating an operation example of a pixel control signal generation unit and a pixel unit in the photoelectric conversion device according to the fourth embodiment of the present invention.

DESCRIPTION OF THE EMBODIMENTS

Preferred embodiments of the present invention will now be described in detail in accordance with the accompanying drawings.

First Embodiment

Figure 1:
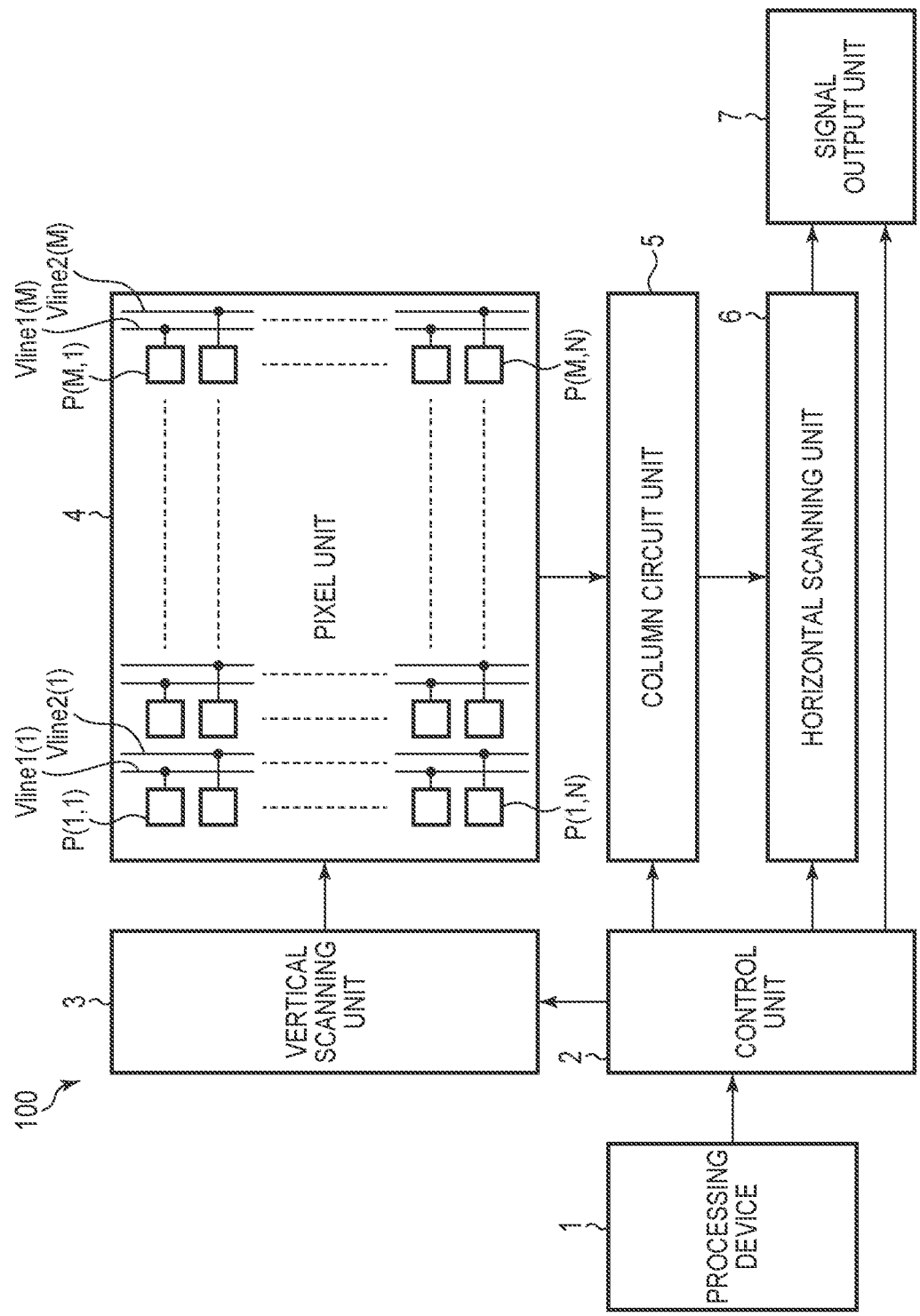
FIG. 1 is a block diagram illustrating a schematic configuration of a photoelectric conversion device according to a first embodiment of the present invention.

A schematic configuration of a photoelectric conversion device according to a first embodiment of the present invention will be described with reference to FIG. 1. FIG. 1 is a block diagram illustrating a schematic configuration of a photoelectric conversion device according to the present embodiment.

As illustrated in FIG. 1, for example, the photoelectric conversion device 100 according to the present embodiment may include a processing device (processor) 1, a control unit 2, a vertical scanning unit 3, a pixel unit 4, a column circuit unit 5, a horizontal scanning unit 6, and a signal output unit 7. The vertical scanning unit 3 and the column circuit unit 5 are connected to the pixel unit 4. A horizontal scanning unit 6 is connected to the column circuit unit 5. A signal output unit 7 is connected to the horizontal scanning unit 6. A control unit 2 is connected to the vertical scanning unit 3, the column circuit unit 5, the horizontal scanning unit 6, and the signal output unit 7. The processing device 1 is connected to the control unit 2.

The processing device 1 is, for example, a central processing unit (CPU), and controls the overall operation of the photoelectric conversion device 100. The processing device 1 outputs a control signal such as a synchronization signal and a setting signal such as an operation mode to the control unit 2. The processing device 1 may be provided in a system in which the photoelectric conversion device 100 is mounted, that is, outside the photoelectric conversion device 100.

The control unit 2 is a control circuit that receives a control signal such as a synchronization signal and a setting signal such as an operation mode from the processing device 1 and outputs control signals for controlling the operation and timing of the vertical scanning unit 3, the column circuit unit 5, the horizontal scanning unit 6, and the signal output unit 7.

In the pixel unit 4, a plurality of pixels P each including a photoelectric converter is two-dimensionally arranged so as to form a plurality of rows and a plurality of columns. Each of the plurality of pixels P is configured to output a pixel signal corresponding to an amount of light incident on the photoelectric converter. FIG. 1 illustrates a pixel unit 4 including pixels P arranged in a matrix of M columns×N rows. In some of the plurality of pixels P, coordinates represented by (m, n) are added to the reference sign P of the pixel. Here, m is a column number represented by an integer of 1 to M, and n is a row number represented by an integer of 1 to N. Note that in this specification, an extending direction (row direction) of each row is defined as a horizontal direction, and an extending direction (column direction) of each column is defined as a vertical direction. It is also assumed that the row number of the lead row is the first row, and the column number of the lead column is the first column.

Two vertical output lines Vline1 and Vline2 are arranged in each column of the pixel unit 4. The reference numerals of the vertical output lines Vline1 and Vline2 in FIG. 1 are parenthesized to indicate the column number m. Although FIG. 1 illustrates an example in which two vertical output lines Vline are arranged in each column, the number of vertical output lines Vline arranged in each column may be one or three or more.

The vertical scanning unit 3 is a control circuit that operates in response to a signal from the control unit 2, and drives a plurality of pixels P constituting the pixel unit 4 in row units. The operation performed by the vertical scanning unit 3 for the plurality of pixels P constituting the pixel unit 4 includes a reset scan and a readout scan. The reset scan refers to an operation of starting exposure by sequentially releasing the reset state of the photoelectric converter to the charge accumulation state on a row-by-row basis with respect to the pixels P in some or all of the rows of the pixel unit 4. The readout scan refers to an operation of sequentially outputting a signal based on charge accumulated in the photoelectric converter on a row-by-row basis from the pixels P in some or all of the rows of the pixel unit 4. The vertical scanning unit 3 supplies control signals to the pixels P on a row-by-row basis via control lines (not illustrated) arranged in respective rows of the pixel unit 4. The vertical scanning unit 3 may be configured using a shift register or an address decoder.

The column circuit unit 5 is a circuit block that performs predetermined processing on the pixel signals output from the pixels P of the pixel unit 4, and may include, for example, an amplifier circuit, an analog-to-digital conversion (AD conversion) circuit, and a memory corresponding to each of the vertical output lines Vline. In this case, the column circuit unit 5 performs amplification processing and AD conversion processing on the pixel signal which is an analog signal output from the pixels P in each column of the pixel unit 4 via the vertical output line Vline, and holds the pixel signal as digital data in the memory.

The horizontal scanning unit 6 is a control circuit that operates in response to a signal from the control unit 2, and sequentially transfers digital data held in the memory of the column circuit unit 5 to the signal output unit 7 for each column. The horizontal scanning unit 6 may be configured using a shift register or an address decoder.

The signal output unit 7 is an output circuit that digitally processes the signal transferred from the horizontal scanning unit 6 and outputs the serial data to the outside of the photoelectric conversion device 100. The signal output unit 7 may include a digital processing unit, a parallel/serial conversion circuit, and an output circuit such as LVDS (Low Voltage Differential Signaling).

It is not essential for the column circuit unit 5 to have an AD conversion function, and for example, the AD conversion processing may be performed outside the photoelectric conversion device 100. In this case, the configurations of the horizontal scanning unit 6 and the signal output unit 7 are also changed as appropriate so as to be compatible with the analog signal processing.

Figure 2:
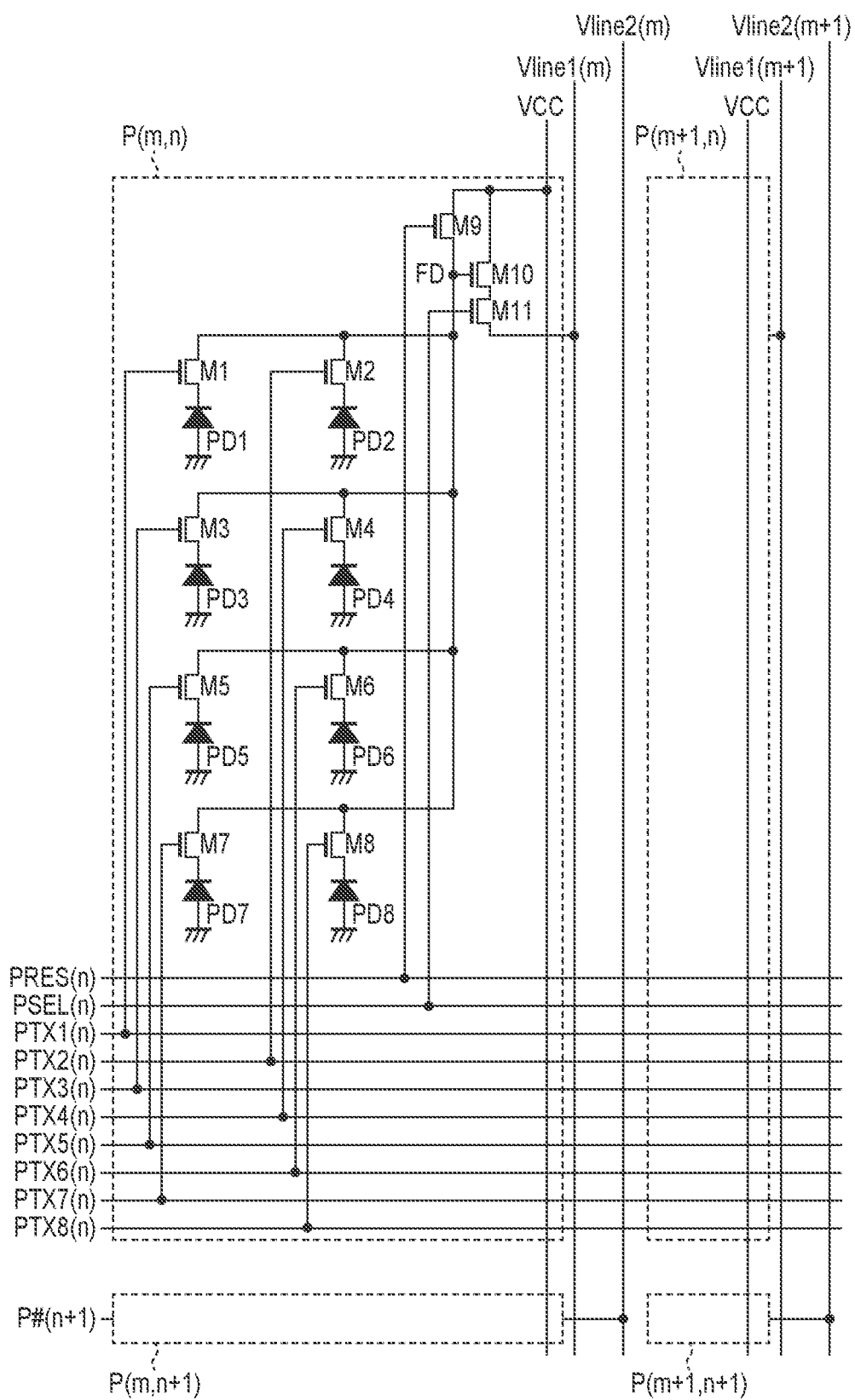
FIG. 2 is a circuit diagram illustrating a configuration example of a pixel in the photoelectric conversion device according to the first embodiment of the present invention.

Next, a configuration example of the pixel P in the photoelectric conversion device according to the present embodiment will be described with reference to FIG. 2. FIG. 2 is a circuit diagram illustrating a configuration example of a pixel P in the photoelectric conversion device according to the present embodiment. FIG. 2 illustrates only the configuration of the pixel P (m, n) arranged in the m-th column and the n-th row out of the pixels P constituting the pixel unit 4, but the same applies to other pixels P.

As illustrated in FIG. 2, for example, each pixel P may include eight photoelectric converters PD1 to PD8, eight transfer transistors M1 to M8, a reset transistor M9, an amplifier transistor M10, and a select transistor M11. The number of the photoelectric converters PD included in each pixel P is not necessarily eight.

The photoelectric converters PD1 to PD8 may be configured by photoelectric conversion elements such as photodiodes and photogates. Here, it is assumed that the photoelectric converters PD1 to PD8 are configured by photodiodes. The photodiode constituting the photoelectric converter PD1 has an anode connected to a ground node and a cathode connected to a source of the transfer transistor M1. Similarly to the photodiodes constituting the photoelectric converter PD1, the photodiodes constituting the photoelectric converters PD2 to PD8 have an anode connected to the ground node and a cathode connected to sources of the transfer transistors M2 to M8, respectively.

Drains of the transfer transistors M1 to M8 are connected to a source of the reset transistor M9 and a gate of the amplifier transistor M10. A connection node between the drains of the transfer transistors M1 to M8, the source of the reset transistor M9, and the gate of the amplifier transistor M10 is a so-called floating diffusion FD. A drain of the reset transistor M9 and a drain of the amplifier transistor M10 are connected to a power supply voltage node (voltage VCC). A source of the amplifier transistor M10 is connected to a drain of the select transistor M11. A source of the select transistor M11 is connected to a vertical output line Vline1 (m). The vertical output line to which the pixel P is connected is different for each row. For example, the source of the select transistor M11 of the pixel P in the odd row may be connected to the vertical output line Vline1 (m), and the source of the select transistor M11 of the pixel Pin the even row may be connected to the vertical output line Vline2 (m). The connections to the vertical output lines Vline1 and Vline2 do not necessarily need to be changed for each row, and may be changed for each of a plurality of rows. The same applies to the case where there are three or more vertical output lines Vline arranged in each column.

In the case of the pixel configuration illustrated in FIG. 2, each of the control lines arranged in each row of the pixel unit 4 includes eight transfer gate signal lines corresponding to each of the transfer transistors M1 to M8, a reset signal line, and a select signal line. Each of the eight transfer gate signal lines in the n-th row supplies a corresponding control signal among the control signals PTX1 (n) to PTX8 (n) output from the vertical scanning unit 3 to a gate of a corresponding transfer transistor among the transfer transistors M1 to M8. For example, the transfer gate signal line corresponding to the transfer transistor M1 of the pixel P of the n-th row supplies the control signal PTX1 (n) to the gate of the transfer transistor M1 of the pixel P of the n-th row. The same applies to the transfer gate signal lines corresponding to the transfer transistors M2 to M8 of the pixel P of the n-th row. The reset signal line of the n-th row supplies the control signal PRES (n) output from the vertical scanning unit 3 to the gate of the reset transistor M9 of the pixel P of the n-th row. The select signal line of the n-th row supplies the control signal PSEL (n) output from the vertical scanning unit 3 to the gate of the select transistor M11 of the pixel P of the n-th row. Common control signals are supplied from the vertical scanning unit 3 to the pixels P in the same row.

Each of the photoelectric converters PD1 to PD8 converts (photoelectrically converts) incident light into a charge of an amount corresponding to an amount of light, and accumulates the generated charge. When each of the transfer transistors M1 to M8 is turned on (conductive state), the charge held by the corresponding one of the photoelectric converters PD1 to PD8 is transferred to the floating diffusion FD. That is, the photoelectric converters PD1 to PD8 share one floating diffusion FD. The floating diffusion FD has a capacitance component, holds charge transferred from the photoelectric converters PD1 to PD8, and sets the floating diffusion FD to a potential corresponding to the amount of charge by charge-voltage conversion by the capacitance component. The amplifier transistor M10 has a configuration in which a voltage VCC is supplied to the drain thereof and a bias current is supplied to the source thereof from a current source (not illustrated) via the vertical output line Vline1 (m) and the select transistor M11, and constitutes a source follower circuit having a gate as an input. Thus, the amplifier transistor M10 outputs a signal based on the potential of the floating diffusion FD to the vertical output line Vline1 (m) via the select transistor M11. The reset transistor M9 is turned on to reset the floating diffusion FD to a potential corresponding to the power supply voltage. Further, by turning on (conducting) the transfer transistors M1 to M8 simultaneously with the reset transistor M9, the photoelectric converters PD1 to PD8 may be reset to a potential corresponding to the voltage VCC. The select transistor M11 switches the connection between the amplifier transistor M10 and the vertical output line Vline1 (m).

Each of the photoelectric converters PD1 to PD8 is in an accumulation state in which a charge generated by photoelectric conversion is accumulated when the corresponding one of the transfer transistors M1 to M8 is off (non-conduction state). Each of the photoelectric converters PD1 to PD8 is in a non-accumulation state in which a charge is not accumulated, that is, a reset state when corresponding one of the transfer transistors M1 to M8 and the reset transistor M9 are turned on (conductive state). The charge accumulated in each of the photoelectric converters PD1 to PD8 is transferred to the floating diffusion FD when the reset transistor M9 is in an off state (non-conductive state) and the corresponding one of the transfer transistors M1 to M8 is in an on state (conductive state), whereby the pixel P enters a readout state. The reset of the photoelectric converters PD1 to PD8 may be controlled by another transistor (not illustrated) connecting the cathodes of the photoelectric converters PD1 to PD8 to the power supply voltage.

When each transistor is formed of an n-channel transistor, the corresponding transistor is turned on when a high-level control signal is supplied from the vertical scanning unit 3, and the corresponding transistor is turned off when a low-level control signal is supplied from the vertical scanning unit 3. Here, the high level corresponds to the logical value "1", and the low level corresponds to the logical value "0". Each transistor included in the pixel P may be configured by an n-channel transistor, but may be configured by a p-channel transistor.

Figure 3:
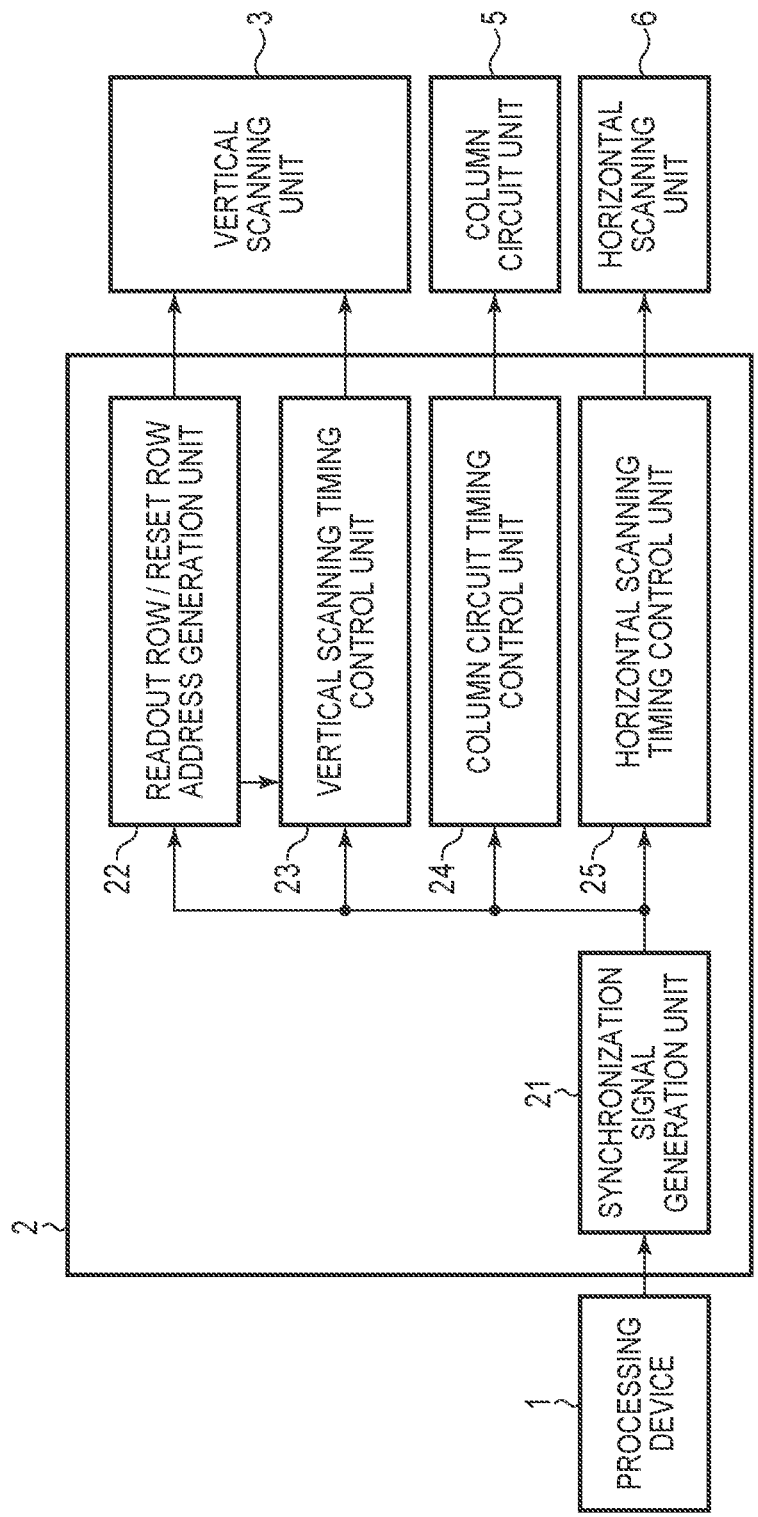
FIG. 3 is a block diagram illustrating a configuration example of a control unit in the photoelectric conversion device according to the first embodiment of the present invention.

Next, a configuration example of the control unit 2 in the photoelectric conversion device according to the present embodiment will be described with reference to FIG. 3. FIG. 3 is a block diagram illustrating a configuration example of the control unit 2 in the photoelectric conversion device according to the present embodiment.

As illustrated in FIG. 3, the control unit 2 includes a synchronization signal generation unit 21, a readout row/reset row address generation unit 22, a vertical scanning timing control unit 23, a column circuit timing control unit 24, and a horizontal scanning timing control unit 25.

The synchronization signal generation unit 21 generates a vertical synchronization signal V_RD for readout processing, vertical synchronization signals V_SHA and V_SHB for reset processing, and a horizontal synchronization signal Hpd in accordance with a control signal from the processing device 1. The generation cycle of the horizontal synchronization signal Hpd is a cycle pd for switching the selection of the photoelectric converters PD1 to PD8. The number of vertical synchronization signals for reset processing may be appropriately changed depending on the configuration of the readout row/reset row address generation unit 22, and may be one or three or more.

The readout row/reset row address generation unit 22 generates a readout row address signal, a reset A row address signal, and a reset B row address signal in accordance with the synchronization signals from the synchronization signal generation unit 21, and outputs them to the vertical scanning unit 3. The readout row address (row address signal addr_rd) indicates the position of the row in which the pixel P to be read out is arranged. Each of the reset A row address (row address signal addr_sha) and the reset B row address (row address signal addr_shb) indicate the position of the row in which the pixel P to be subjected to the reset process is arranged. The number of reset row addresses may be one or three or more.

The readout row/reset row address generation unit 22 generates a count signal (cnt_hpd_rd) for readout processing and count signals (cnt_hpd_sha, cnt_hpd_shb) for reset processing, and outputs them to the vertical scanning timing control unit 23. The number of count signals for reset processing may be one or three or more.

The vertical scanning timing control unit 23 generates a signal for controlling the driving timing of the vertical scanning unit 3 in accordance with the synchronization signals from the synchronization signal generation unit 21 and the count signal from the readout row/reset row address generation unit 22, and outputs the signal to the vertical scanning unit 3.

The column circuit timing control unit 24 generates a signal for controlling the driving timing of the column circuit unit 5 in accordance with the synchronization signals from the synchronization signal generation unit 21, and outputs the signal to the column circuit unit 5.

The horizontal scanning timing control unit 25 generates a signal for controlling the driving timing of the horizontal scanning unit 6 in accordance with the synchronization signals from the synchronization signal generation unit 21, and outputs the signal to the horizontal scanning unit 6.

Figure 4:
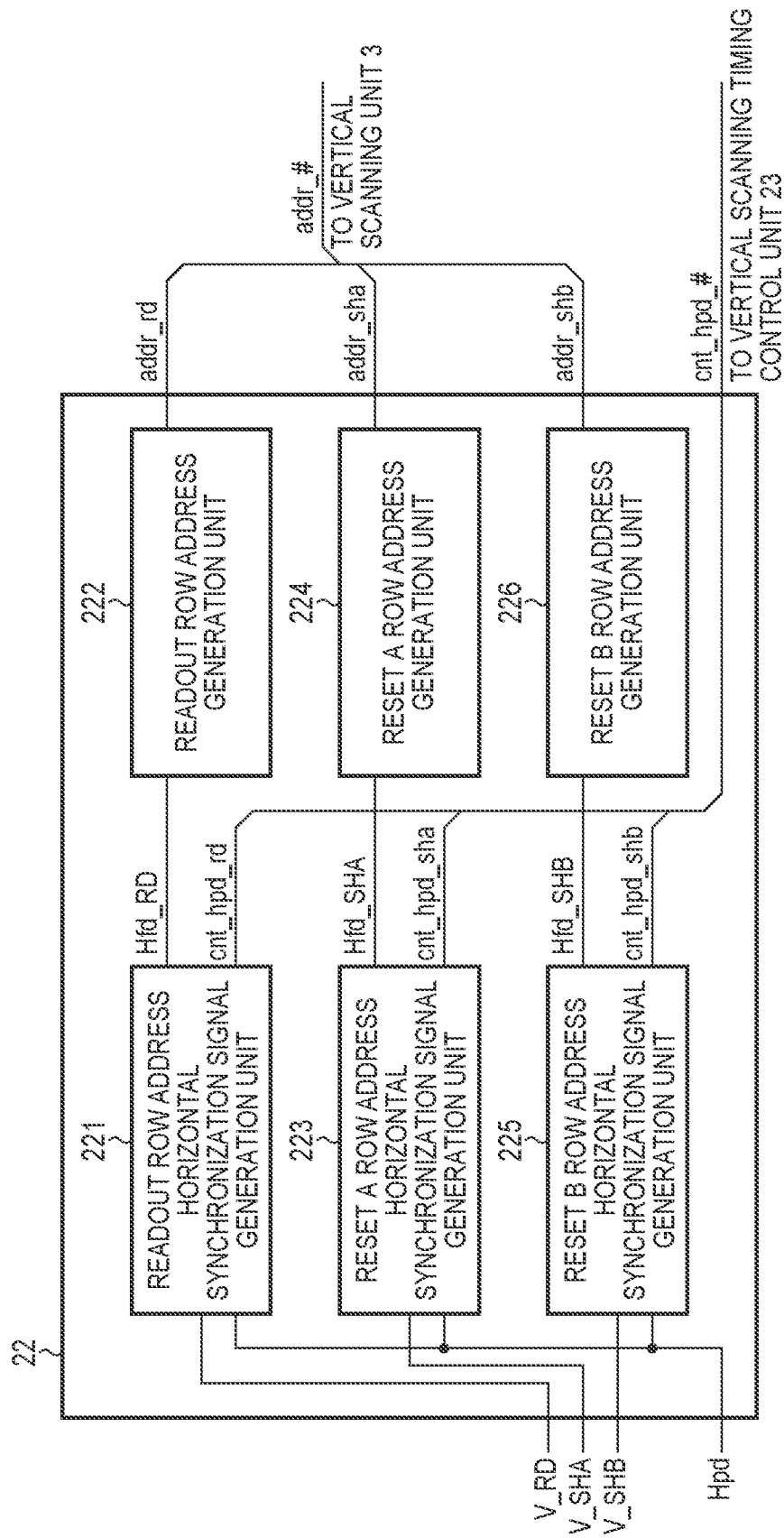
FIG. 4 is a block diagram illustrating a configuration example of a readout row/reset row address generation unit in the photoelectric conversion device according to the first embodiment of the present invention.

Next, a configuration example of the readout row/reset row address generation unit 22 in the photoelectric conversion device according to the present embodiment will be described with reference to FIG. 4. FIG. 4 is a block diagram illustrating a configuration example of the readout row/reset row address generation unit in the photoelectric conversion device according to the present embodiment.

As illustrated in FIG. 4, the readout row/reset row address generation unit 22 includes a readout row address horizontal synchronization signal generation unit 221 and a readout row address generation unit 222. The readout row/reset row address generation unit 22 further includes a reset A row address horizontal synchronization signal generation unit 223, a reset A row address generation unit 224, a reset B row address horizontal synchronization signal generation unit 225, and a reset B row address generation unit 226. The number of horizontal synchronization signal generation units for reset row addresses and the number of reset row address generation units may be one or three or more.

The readout row address horizontal synchronization signal generation unit 221 receives the vertical synchronization signal V_RD and the horizontal synchronization signal Hpd supplied from the synchronization signal generation unit 21, and generates a horizontal synchronization signal Hfd_RD and a count signal cnt_hpd_rd. The horizontal synchronization signal Hfd_RD is a signal generated in a cycle fd in which the selection of the floating diffusion FD is switched, and is output to the readout row address generation unit 222. The period pd for switching the selection of the photoelectric converters PD1 to PD8 is shorter than the period fd for switching the selection of the floating diffusion FD. The count signal cnt_hpd_rd is an output signal of a counter for the readout operation that counts the horizontal synchronization signal Hpd, and is output to the vertical scanning timing control unit 23.

The readout row address generation unit 222 receives the horizontal synchronization signal Hfd_RD supplied from the readout row address horizontal synchronization signal generation unit 221, generates an address (row address signal addr_rd) of a row to be read out, and outputs the address to the vertical scanning unit 3.

The reset A row address horizontal synchronization signal generation unit 223 receives the vertical synchronization signal V_SHA and the horizontal synchronization signal Hpd supplied from the synchronization signal generation unit 21, and generates a horizontal synchronization signal Hfd_SHA and a count signal cnt_hpd_sha. The horizontal synchronization signal Hfd_SHA is a signal generated in a cycle fd in which the selection of the floating diffusion FD is switched, and is output to the reset A row address generation unit 224. The count signal cnt_hpd_sha is an output signal of a counter for the reset operation that counts the horizontal synchronization signal Hpd, and is output to the vertical scanning timing control unit 23.

The reset A row address generation unit 224 receives the horizontal synchronization signal Hfd_SHA supplied from the reset A row address horizontal synchronization signal generation unit 223, generates an address (row address signal addr_sha) of a row to be subjected to a reset A processing, and outputs the generated address to the vertical scanning unit 3.

The reset B row address horizontal synchronization signal generation unit 225 receives the vertical synchronization signal V_SHB and the horizontal synchronization signal Hpd supplied from the synchronization signal generation unit 21, and generates a horizontal synchronization signal Hfd_SHB and a count signal cnt_hpd_shb. The horizontal synchronization signal Hfd_SHB is a signal generated in a cycle fd in which the selection of the floating diffusion FD is switched, and is output to the reset B row address generation unit 226. The count signal cnt_hpd_shb is an output signal of a counter for the reset operation that counts the horizontal synchronization signal Hpd, and is output to the vertical scanning timing control unit 23.

The reset B row address generation unit 226 receives the horizontal synchronization signal Hfd_SHB supplied from the reset B row address horizontal synchronization signal generation unit 225, generates an address (row address signal addr_shb) of a row to be subjected to a reset B processing, and outputs the generated address to the vertical scanning unit 3.

Figure 5:
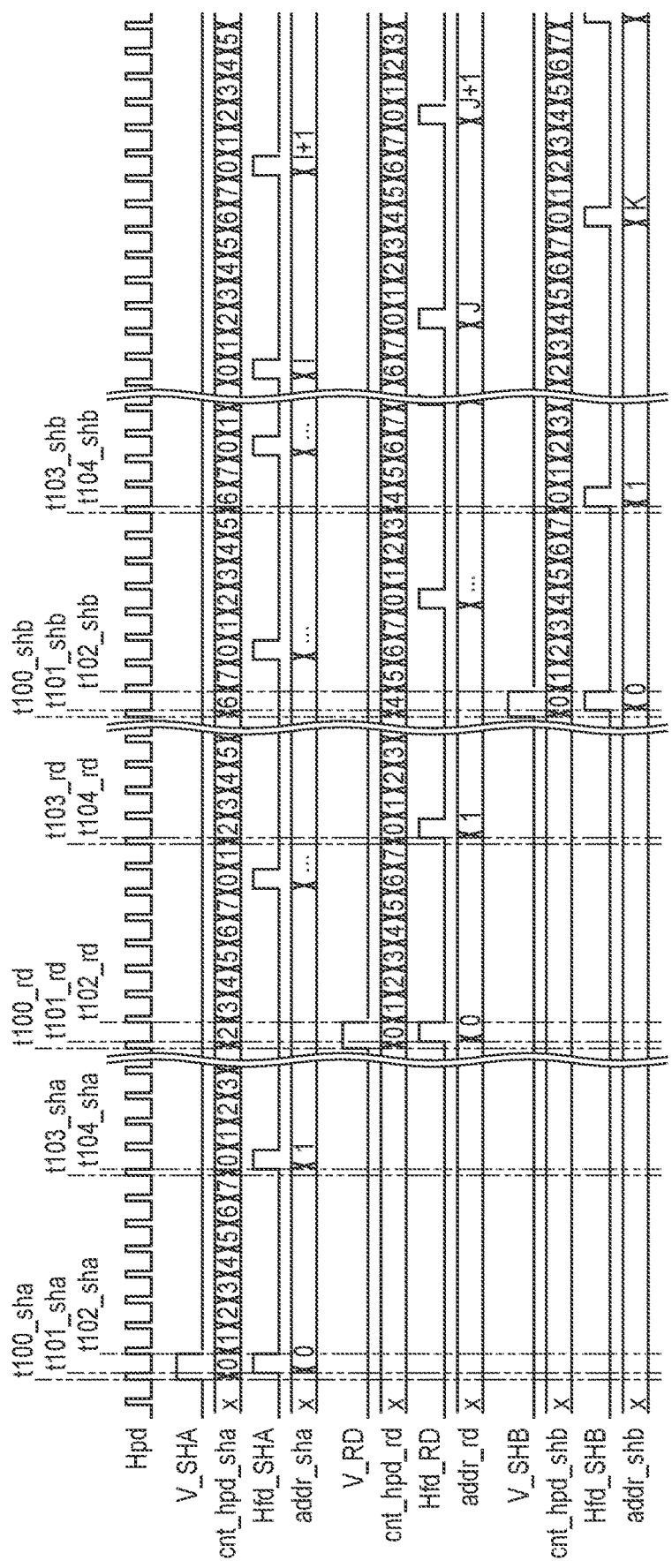
FIG. 5 is a timing chart illustrating an operation example of a readout row/reset row address generation unit in the photoelectric conversion device according to the first embodiment of the present invention.

Next, an operation example of the readout row/reset row address generation unit 22 in the photoelectric conversion device according to the present embodiment will be described with reference to FIG. 5. FIG. 5 is a timing chart illustrating an operation example of the readout row/reset row address generation unit 22 in the photoelectric conversion device according to the present embodiment.

First, an operation of generating a readout row address (row address signal addr_rd) will be described with reference to FIG. 5.

At time t100_rd, the vertical synchronization signal V_RD supplied from the synchronization signal generation unit 21 transitions from the low level to the high level. In response to the transition of the vertical synchronization signal V_RD from the low level to the high level, the count value of the count signal cnt_hpd_rd is initialized to 0.

At a subsequent time t101_rd, in response to the initialization of the count value of the count signal cnt_hpd_rd to 0, the horizontal synchronization signal Hfd_RD transitions from the low level to the high level. The timing at which the horizontal synchronization signal Hfd_RD transitions from the low level to the high level is not necessarily the timing corresponding to the value 0 of the count signal cnt_hpd_rd, and may be controlled by a register or the like.

Also at time t101_rd, in response to the transition of the horizontal synchronization signal Hfd_RD from the low level to the high level, the value of the row address signal addr_rd transitions to 0. The value 0 is a preset value, and may be controlled by a register or the like.

At a subsequent time t102_rd, the horizontal synchronization signal Hpd supplied from the synchronization signal generation unit 21 transitions from the low level to the high level. In response to the transition of the horizontal synchronization signal Hpd from the low level to the high level, the count value of the count signal cnt_hpd_rd is counted up and transitions from 0 to 1. Thereafter, the count value of the count signal cnt_hpd_rd is counted up each time the horizontal synchronization signal Hpd transitions from the low level to the high level.

At a subsequent time t103_rd, the horizontal synchronization signal Hpd transitions from the low level to the high level. Assuming that the count value of the count signal cnt_hpd_rd is 7 at time t103_rd, the count value of the count signal cnt_hpd_rd is initialized to 0 in response to the transition of the horizontal synchronization signal Hpd from the low level to the high level. The timing at which the count value of the count signal cnt_hpd_rd is initialized to 0 is not necessarily the timing corresponding to the value 7 of the count signal cnt_hpd_rd, and may be controlled by a register or the like.

At a subsequent time t104_rd, in response to the initialization of the count value of the count signal cnt_hpd_rd to 0, the horizontal synchronization signal Hfd_RD transitions from the low level to the high level.

Also at time t104_rd, in response to the transition of the horizontal synchronization signal Hfd_RD from the low level to the high level, the value of the row address signal addr_rd is counted up and transitions from 0 to 1. The count-up width does not necessarily have to be +1, and may be configured to transition to a specific value without counting up. Alternatively, the value of the row address signal addr_rd may be controlled by a register or the like. Thereafter, the value of the row address signal addr_rd is counted up each time the horizontal synchronization signal Hfd_RD transitions from the low level to the high level. That is, the update cycle of the value of the row address signal addr_rd is the cycle fd.

As described above, in this driving example, the timing corresponding to the value 7 of the count signal cnt_hpd_rd is the timing of initialization of the count value of the count signal cnt_hpd_rd and the update timing of the row address signal addr_rd. The value 7 is a setting value that defines the update timing of the row address signal addr_rd.

Next, the operation of generating the reset A row address (row address signal addr_sha) will be described with reference to FIG. 5.

At time t100_sha, the vertical synchronization signal V_SHA supplied from the synchronization signal generation unit 21 transitions from the low level to the high level. In response to the transition of the vertical synchronization signal V_SHA from the low level to the high level, the count value of the count signal cnt_hpd_sha is initialized to 0.

At a subsequent time t101_sha, in response to the initialization of the count value of the count signal cnt_hpd_sha to 0, the horizontal synchronization signal Hfd_SHA transitions from the low level to the high level. The timing at which the horizontal synchronization signal Hfd_SHA transitions from the low level to the high level is not necessarily the timing corresponding to the value 0 of the count signal cnt_hpd_sha, and may be controlled by a register or the like.

Also at time t101_sha, in response to the transition of the horizontal synchronization signal Hfd_SHA from a low level to a high level, the value of the row address signal addr_sha is changed to 0. The value 0 is a preset value, and may be controlled by a register or the like.

At a subsequent time t102_sha, the horizontal synchronization signal Hpd supplied from the synchronization signal generation unit 21 transitions from the low level to the high level. In response to the transition of the horizontal synchronization signal Hpd from the low level to the high level, the count value of the count signal cnt_hpd_sha is counted up and transitions from 0 to 1. Thereafter, the count value of the count signal cnt_hpd_sha is counted up each time the horizontal synchronization signal Hpd transitions from the low level to the high level.

At a subsequent time t103_sha, the horizontal synchronization signal Hpd transitions from the low level to the high level. Assuming that the count value of the count signal cnt_hpd_sha is 7 at time t103_sha, the count value of the count signal cnt_hpd_sha is initialized to 0 in response to the transition of the horizontal synchronization signal Hpd from the low level to the high level. The timing at which the count signal cnt_hpd_sha is initialized to 0 is not necessarily the timing corresponding to the value 7 of the count signal cnt_hpd_sha, and may be controlled by a register or the like.

At a subsequent time t104_sha, in response to the initialization of the count value of the count signal cnt_hpd_sha to 0, the horizontal synchronization signal Hfd_SHA transitions from the low level to the high level.

Also at time t104_sha, in response to the transition of the horizontal synchronization signal Hfd_SHA from the low level to the high level, the value of the row address signal addr_sha is counted up and transitions from 0 to 1. The count-up width does not necessarily have to be +1, and may be configured to transition to a specific value without counting up. Alternatively, the value of the row address signal addr_sha may be controlled by a register or the like. Thereafter, the value of the row address signal addr_sha is counted up each time the horizontal synchronization signal Hfd_SHA transitions from the low level to the high level. That is, the update cycle of the value of the row address signal addr_sha is the cycle fd.

Thus, in this driving example, the timing corresponding to the value 7 of the count signal cnt_hpd_sha is the timing of initialization of the count value of the count signal cnt_hpd_sha, and the timing of updating the row address signal addr_sha. The value 7 is a setting value that defines the update timing of the row address signal addr_sha.

Next, the operation of generating the reset B row address (row address signal addr_shb) will be described with reference to FIG. 5.

At time t100_shb, the vertical synchronization signal V_SHB supplied from the synchronization signal generation unit 21 transitions from the low level to the high level. In response to the transition of the vertical synchronization signal V_SHB from the low level to the high level, the count value of the count signal cnt_hpd_shb is initialized to 0.

At a subsequent time t101_shb, in response to the initialization of the count value of the count signal cnt_hpd_shb to 0, the horizontal synchronization signal Hfd_SHB transitions from the low level to the high level. The timing at which the horizontal synchronization signal Hfd_SHB transitions from the low level to the high level is not necessarily the timing corresponding to the value 0 of the count signal cnt_hpd_shb, and may be controlled by a register or the like.

Also at time t101_shb, the horizontal synchronization signal Hfd_SHB transitions from the low level to the high level, and the value of the row address signal addr_shb transitions to 0. The value 0 is a preset value, and may be controlled by a register or the like.

At a subsequent time t102_shb, the horizontal synchronization signal Hpd supplied from the synchronization signal generation unit 21 transitions from the low level to the high level. In response to the transition of the horizontal synchronization signal Hpd from the low level to the high level, the count value of the count signal cnt_hpd_shb is counted up and transitions from 0 to 1. Thereafter, the count value of the count signal cnt_hpd_shb is counted up each time the horizontal synchronization signal Hpd transitions from the low level to the high level.

At a subsequent time t103_shb, the horizontal synchronization signal Hpd transitions from the low level to the high level. Assuming that the count value of the count signal cnt_hpd_shb is 7 at time t103_shb, the count value of the count signal cnt_hpd_shb is initialized to 0 in response to the transition of the horizontal synchronization signal Hpd from the low level to the high level. The timing at which the count value of the count signal cnt_hpd_shb is initialized to 0 is not necessarily the timing corresponding to the value 7 of the count signal cnt_hpd_shb, and may be controlled by a register or the like.

At a subsequent time t104_shb, the count value of the count signal cnt_hpd_shb is initialized to 0, and the horizontal synchronization signal Hfd_SHB transitions from the low level to the high level.

Also at time t104_shb, in response to the transition of the horizontal synchronization signal Hfd_SHB from the low level to the high level, the value of the row address signal addr_shb is counted up and transitions from 0 to 1. The count-up width does not necessarily have to be +1, and may be configured to transition to a specific value without counting up. Alternatively, the value of the row address signal addr_shb may be controlled by a register or the like. Thereafter, the value of the row address signal addr_shb is counted up each time the horizontal synchronization signal Hfd_SHB transitions from the low level to the high level. That is, the update cycle of the value of the row address signal addr_shb is the cycle fd.

Thus, in this driving example, the timing corresponding to the value 7 of the count signal cnt_hpd_shb is the timing of initialization of the count value of the count signal cnt_hpd_shb, and the timing of updating the row address signal addr_shb. The value 7 is a setting value that defines the update timing of the row address signal addr_shb.

Figure 6:
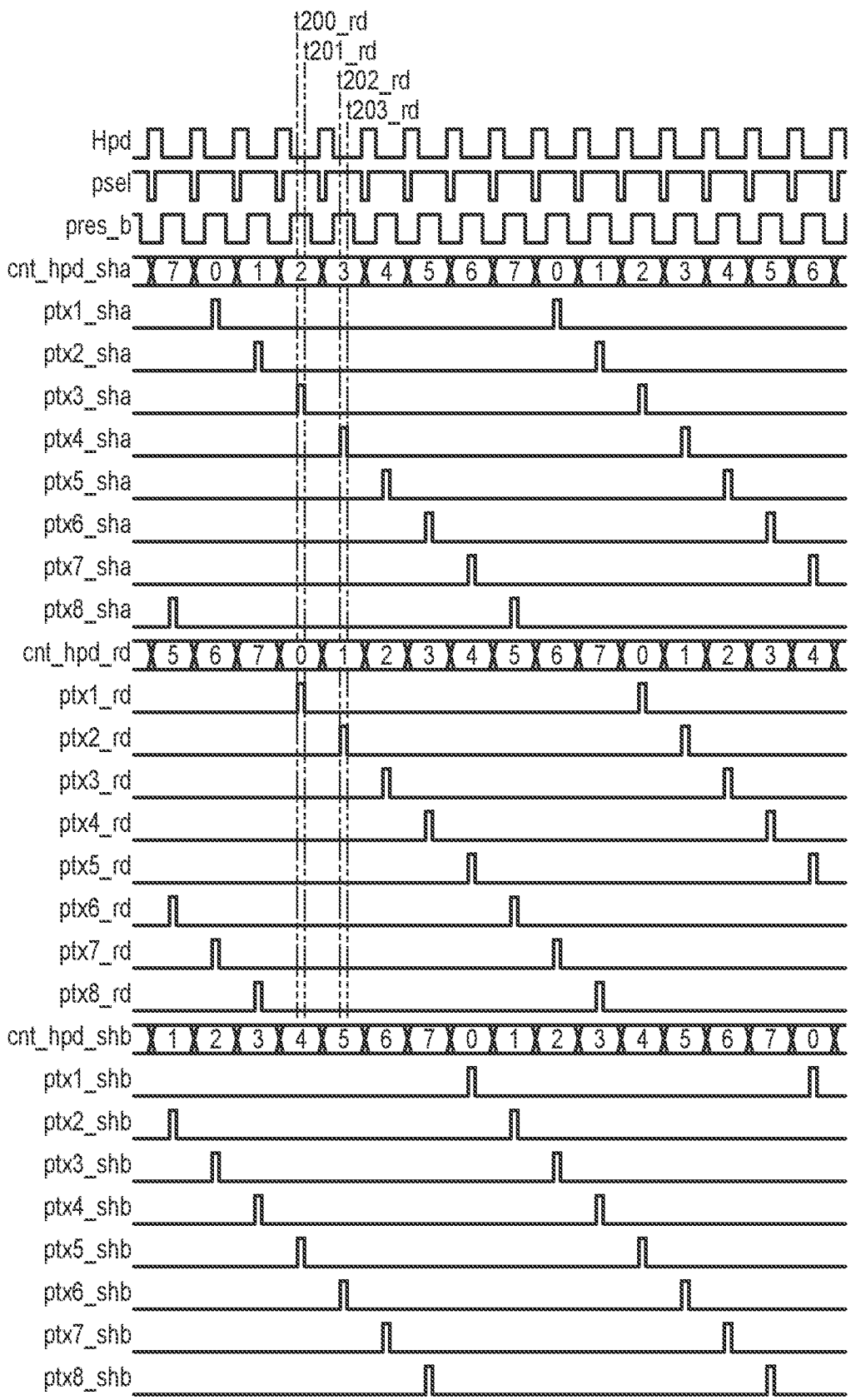
FIG. 6 is a timing chart illustrating an operation example of a vertical scanning timing control unit in the photoelectric conversion device according to the first embodiment of the present invention.

Next, an operation example of the vertical scanning timing control unit 23 in the photoelectric conversion device according to the present embodiment will be described with reference to FIG. 6. FIG. 6 is a timing chart illustrating an operation example of the vertical scanning timing control unit 23 in the photoelectric conversion device according to the present embodiment.

The vertical scanning timing control unit 23 generates control signals psel, pres_b, ptx1_rd to ptx8_rd, ptx1_sha to ptx8_sha and ptx1_shb to ptx8_shb, and outputs them to the vertical scanning unit 3. The vertical scanning timing control unit 23 generates a readout row memory unit control signal, a reset row memory unit control signal, and a non-accumulation row memory unit control signal, and outputs them to the vertical scanning unit 3. These signals are signals for controlling the driving timing of the vertical scanning unit 3.

The control signal psel and the control signal pres_b transition to the high level and transition to the low level during one Hpd period from the transition of the horizontal synchronization signal Hpd to the high level to the next transition to the high level. The one Hpd period is a period pd in which the selection of the photoelectric converters PD1 to PD8 is switched. The timing at which the levels of the control signal psel and the control signal pres_b change follows a predetermined set value. The set value may be controlled by a register or the like.

The control signals ptx1_rd to ptx8_rd transition to the high level and to the low level during a certain one Hpd period in eight Hpd periods from the time when the count value of the count signal cnt_hpd_rd transitions to 0 to the time when the count value transitions to 0 next. The eight Hpd periods correspond to a period fd in which the selection of the floating diffusion FD is switched. The timing at which the levels of the control signals ptx1_rd to ptx8_rd change follows a preset value. The set value may be controlled by a register or the like.

When the count value of the count signal cnt_hpd_rd is 0, the control signal ptx1_rd transitions to the high level at time t200_rd, and transitions to the low level at subsequent time t201_rd. When the count value of the count signal cnt_hpd_rd is not 0, the control signal ptx1_rd maintains the low level.

Similarly, when the count value of the count signal cnt_hpd_rd is 1, the control signal ptx2_rd transitions to the high level at time t202_rd, and transitions to the low level at the following time t203_rd. When the count value of the count signal cnt_hpd_rd is not 1, the control signal ptx2_rd maintains the low level.

The control signals ptx3_rd to ptx8_rd sequentially perform the same operation. Note that the count value of the count signal cnt_hpd_rd when the level of the control signal ptx1_rd transitions is not necessarily 0, and the timing at which the level of the control signal ptx1_rd transitions may be controlled by a register or the like. The same applies to the control signals ptx2_rd to ptx8_rd. Further, it is not necessary that the levels of the control signals ptx1_rd to ptx8_rd transition during one Hpd period different from each other, and the levels of a plurality of control signals ptx#_rd (# is an integer of 1 to 8) may transition during the same one Hpd period.

The control signals ptx1_sha to ptx8_sha transition to the high level and to the low level during a certain one Hpd period in eight Hpd periods from the time when the count value of the count signal cnt_hpd_sha transitions to 0 to the time when the count value of the count signal cnt_hpd_sha transitions to 0 next. The operation during the one Hpd period is the same as the operation of the control signals ptx1_rd to ptx8_rd.

The control signals ptx1_shb to ptx8_shb transition to the high level and to the low level during a certain one Hpd period in eight Hpd periods from the time when the count value of the count signal cnt_hpd_shb transitions to 0 to the time when the count value of the count signal cnt_hpd_shb transition to 0 next. The operation during the one Hpd period is the same as the operation of the control signals ptx1_rd to ptx8_rd.

Figure 7:
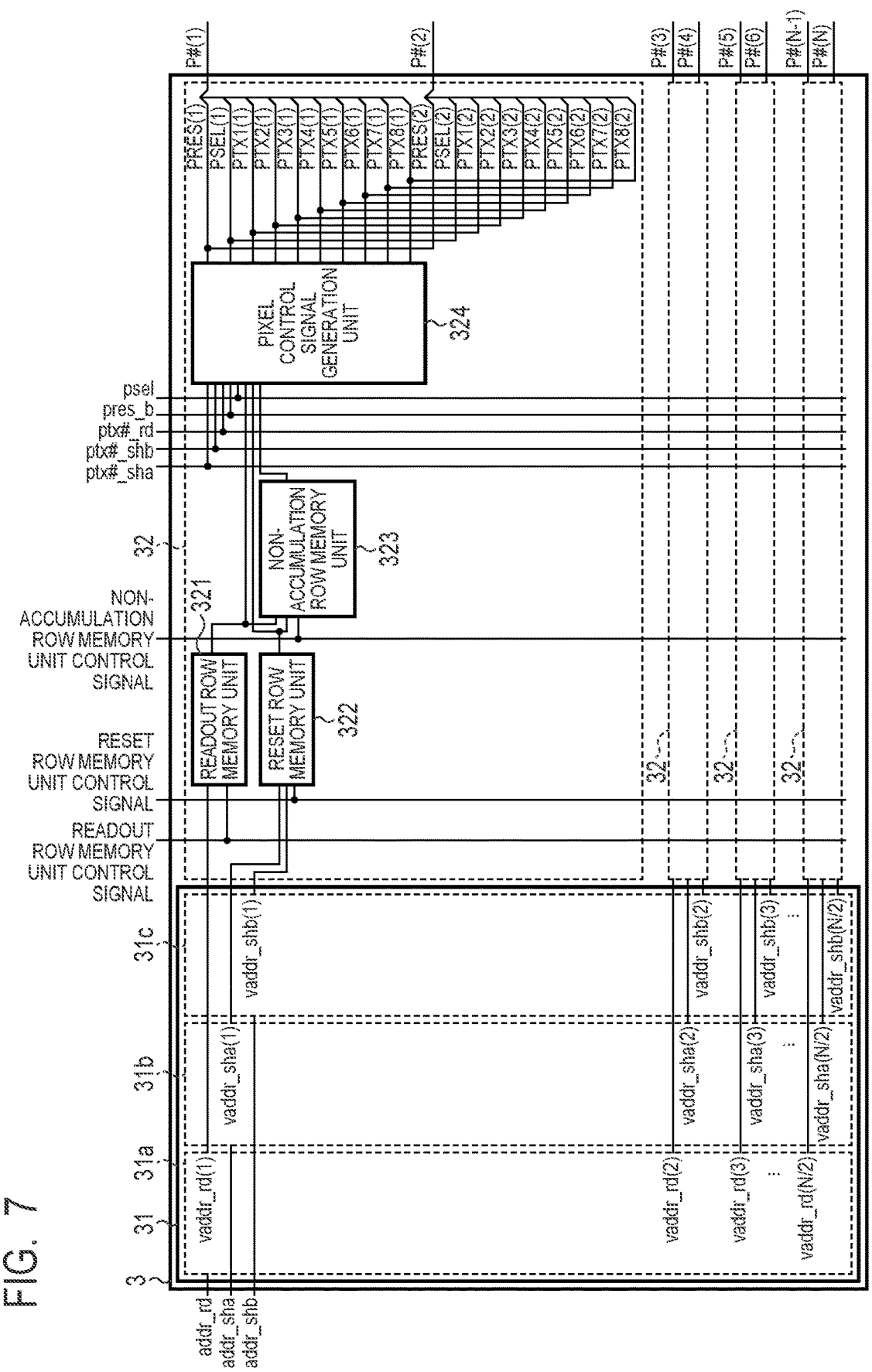
FIG. 7 is a block diagram illustrating a configuration example of a vertical scanning unit in the photoelectric conversion device according to the first embodiment of the present invention.

Next, a configuration example of the vertical scanning unit 3 in the photoelectric conversion device according to the present embodiment will be described with reference to FIG. 7. FIG. 7 is a block diagram illustrating a configuration example of the vertical scanning unit 3 in the photoelectric conversion device according to the present embodiment.

As illustrated in FIG. 7, the vertical scanning unit 3 includes an address decoder unit 31 and a N/2 number of row driving units 32. Although one row driving unit 32 drives two rows in the configuration example of FIG. 7, one row driving unit 32 may drive one row or three or more rows.

As illustrated in FIG. 7, the address decoder unit 31 includes an RD address decoder unit 31a, an SHA address decoder unit 31b, and an SHB address decoder unit 31c.

The RD address decoder unit 31a decodes the row address signal addr_rd generated by the control unit 2 to generate decoded signals vaddr_rd (1) to vaddr_rd (N/2), and outputs the decoded signals to the corresponding row driving unit 32. The row address signal addr_rd is a signal indicating a row number to be driven of the pixel unit 4, and the decode signals vaddr_rd (1) to vaddr_rd (N/2) are signals for selecting the row driving unit 32 corresponding to the row to be driven of the pixel unit 4.

Similarly, the SHA address decoder unit 31b decodes the row address signal addr_sha to generate decode signals vaddr_sha (1) to vaddr_sha (N/2), and outputs the decoded signals to the corresponding row driving unit 32. The row address signal addr_sha is a signal indicating a row number to be driven of the pixel unit 4, and the decode signals vaddr_sha (1) to vaddr_sha (N/2) are signals for selecting the row driving unit 32 corresponding to the row to be driven of the pixel unit 4.

The SHB address decoder unit 31c decodes the row address signal addr_shb to generate decode signals vaddr_shb (1) to vaddr_shb (N/2), and outputs the decoded signals to the corresponding row driving unit 32. The row address signal addr_shb is a signal indicating a row number to be driven of the pixel unit 4, and decode signals vaddr_shb (1) to vaddr_shb (N/2) are signals for selecting the row driving unit 32 corresponding to the row to be driven of the pixel unit 4.

As illustrated in FIG. 7, each of the row driving units 32 includes a readout row memory unit 321, a reset row memory unit 322, a non-accumulation row memory unit 323, and a pixel control signal generation unit 324. Various control signals generated by the control unit 2 are supplied to the vertical scanning unit 3. These control signals are common to the N/2 number of row driving units 32.

In the following description, the configuration of the row driving unit 32 corresponding to the first row and the second row will be mainly described, but the same applies to the configuration of the row driving unit 32 corresponding to other rows.

The decode signal vaddr_rd (1) output from the address decoder unit 31 is input to the readout row memory unit 321. The readout row memory unit 321 is controlled by a readout row memory unit control signal, and stores the level of the decode signal vaddr_rd (1). The output signal of the readout row memory unit 321 is a signal for causing the pixels P in the corresponding row to perform a charge readout processing.

The decode signal vaddr_sha (1) and the decode signal vaddr_shb (1) output from the address decoder unit 31 are input to the reset row memory unit 322. The reset row memory unit 322 is controlled by a reset row memory control signal, and stores the level of the decode signal vaddr_sha (1) and the level of the decode signal vaddr_shb (1). The output signal of the reset row memory unit 322 is a signal for causing the pixels P in the corresponding row to perform a charge reset processing.

The non-accumulation row memory unit 323 is controlled by a non-accumulation row memory unit control signal, and outputs a signal for causing the pixels P that are not being accumulated to perform a charge reset processing according to the output of the readout row memory unit 321 and the output of the reset row memory unit 322.

The pixel control signal generation unit 324 receives signals output from the readout row memory unit 321, the reset row memory unit 322, and the non-accumulation row memory unit 323, and determines whether to perform the readout processing, the reset process, or the non-accumulation process on the pixels P in the target row. Further, the pixel control signal generation unit 324 outputs pixel control signals to the pixels P in the target row in response to the control signal psel, pres_b, ptx1_rd to ptx8_rd, ptx1_sha to ptx8_sha and ptx1_shb to ptx8_shb. The pixel control signals output from the pixel control signal generation unit 324 are control signals PRES(1), PSEL(1), PTX1(1) to PTX8(1), PRES(2), PSEL(2), and PTX1 (2) to PTX8 (2).

Figure 8B:
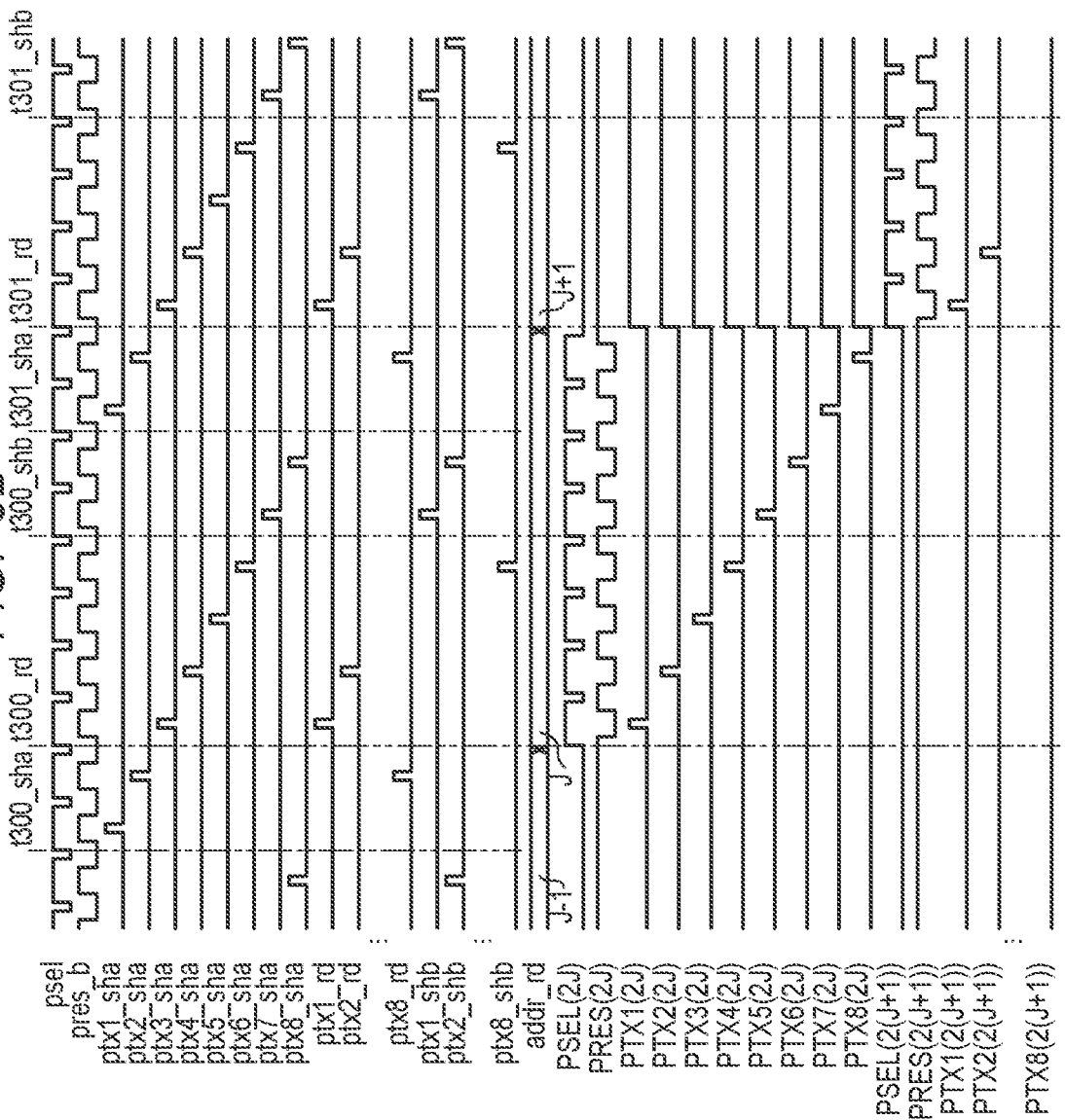
Figure 8C:
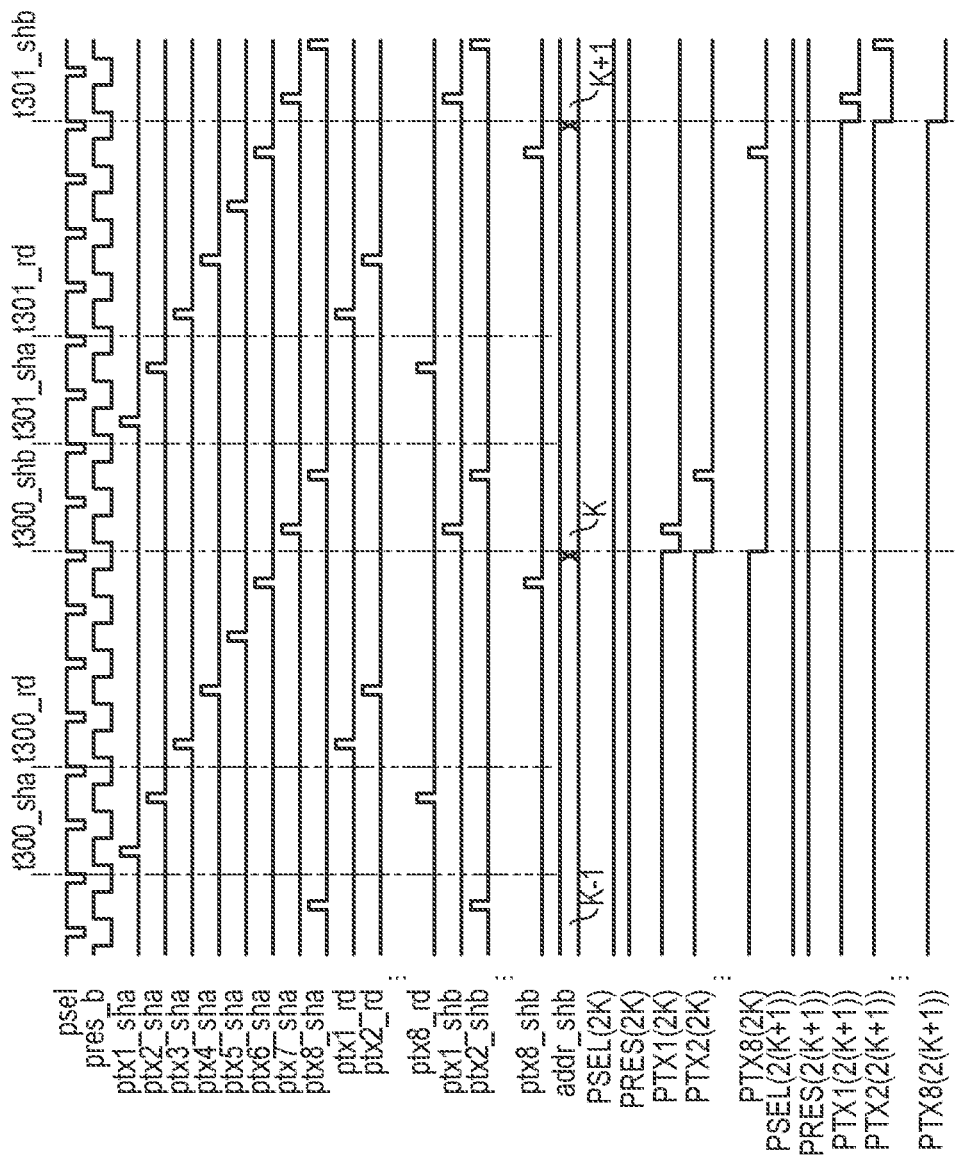

Next, an operation example of the pixel control signal generation unit 324 and the pixel unit 4 in the photoelectric conversion device according to the present embodiment will be described with reference to FIG. 8A to FIG. 8C. FIG. 8A to FIG. 8C are timing charts illustrating operation examples of the pixel control signal generation unit 324 and the pixel unit 4 in the photoelectric conversion device according to the present embodiment.

First, the operation of the pixel control signal generation unit 324 and the pixel unit 4 in the readout processing will be described with reference to FIG. 8B.

It is assumed that the value of the row address signal addr_rd transitions from (J−1) to J at time t300_rd. As a result, the 2J-th row and the (2J−1)-th row of the pixel unit 4 become the target row of the readout processing. Since the 2J-th row and the (2J−1)-th row of the pixel unit 4 are operated in the same manner, only the operation in the 2J-th row of the pixel unit 4 will be described below.

The pixel control signals output to the 2J-th row of the pixel unit 4 are control signals PSEL (2J), PRES (2J), and PTX1 (2J) to PTX8 (2J). The control signal PSEL (2J) is generated by the pixel control signal generation unit 324 using the control signal psel as an original signal. The control signal PRES (2J) is generated by the pixel control signal generation unit 324 using the control signal pres_b as an original signal. The control signals PTX1 (2J) to PTX8 (2J) are generated by the pixel control signal generation unit 324 using the control signals ptx1_rd to ptx8_rd as original signals. Since the value of the row address signal addr_rd indicates J over eight Hpd periods, the 2J-th row of the pixel unit 4 becomes a row to be readout over the eight Hpd periods.

At a subsequent time t301_rd, the value of the row address signal addr_rd transitions from J to (J+1) at the subsequent time t301_rd, and the 2J-th row of the pixel unit 4 becomes a non-accumulation row to be subjected to the non-accumulation processing. In the non-accumulation row, the control signals PTX1 to PTX8 and the control signal PRES are set to the high level to maintain the photoelectric converter PD and the floating diffusion FD in the reset state.

Also at time t301_rd, the value of the row address signal addr_rd transitions from J to (J+1) at time t301_rd, and the (2(J+1))-th row and the (2(J+1)−1)-th row of the pixel unit 4 become the target row of the readout processing. The operation of the (2(J+1))-th row and the (2(J+1)−1)-th row of the pixel unit 4 is the same as the operation of the 2J-th row of the pixel unit 4, and a description thereof will be omitted.

Next, operations of the pixel control signal generation unit 324 and the pixel unit 4 in the reset A processing will be described with reference to FIG. 8A.

It is assumed that the value of the row address signal addr_sha transitions from (I−1) to I at time t300_sha. Thus, the 2I-th row and the (2I−1)-th row of the pixel unit 4 become the target row of the reset A processing. Since the 2I-th row and the (2I−1)-th row of the pixel unit 4 are operated in the same manner, only the operation in the 2I-th row of the pixel unit 4 will be described below.

The pixel control signals output to the 2I-th row of the pixel unit 4 are control signals PSEL (2I), PRES (2I), and PTX1 (2I) to PTX8 (2I). Of these, the control signal PSEL (2I) is fixed to the low level, and the control signal PRES (2I) is fixed to the high level. The control signals PTX1 (2I) to PTX8 (2I) are generated by the pixel control signal generation unit 324 using the control signals ptx1_sha to ptx8_sha as original signals. Since the row address signal addr_sha indicates the value I over eight Hpd periods, the 2I-th row of the pixel unit 4 becomes the target row of the reset A processing over the eight Hpd periods.

At a subsequent time t301_sha, the value of the row address signal addr_sha transitions from I to (I+1), and the 2I-th row of the pixel unit 4 enters an accumulation state. In the row in the accumulation state, the control signals PTX1 to PTX8 are set to the low level to accumulate a charge in the photoelectric converter PD.

Also at time t300_sha, the value of the row address signal addr_sha transitions from I to (I+1), and the non-accumulation processing of the (2(I+1))-th row and the (2(I+1)−1)-th row of the pixel unit 4 is canceled and the (2(I+1))-th row and the (2(I+1)−1)-th row of the pixel unit 4 become the target row of the reset A processing. The operations of the (2(I+1))-th row and the (2(I+1)−1)-th row of the pixel unit 4 are the same as the operation of the 2I-th row of the pixel unit 4, and a description thereof will be omitted.

Next, the operation of the pixel control signal generation unit 324 and the pixel unit 4 in the reset B processing will be described with reference to FIG. 8C.

It is assumed that the value of the row address signal addr_shb transitions from (K−1) to K at time t300_shb. Thus, the 2K-th row and the (2K−1)-th row of the pixel unit 4 become the target row of the reset B processing. Since the 2K-th row and the (2K−1)-th row of the pixel unit 4 are operated in the same manner, only the operation in the 2K-th row of the pixel unit 4 will be described below.

The pixel control signals output to the 2K-th row of the pixel unit 4 are control signals PSEL (2K), PRES (2K), and PTX1 (2K) to PTX8 (2K). Of these, the control signal PSEL (2K) is fixed to the low level, and the control signal PRES (2K) is fixed to the high level. The control signals PTX1 (2K) to PTX8 (2K) are generated by the pixel control signal generation unit 324 using the control signals ptx1_shb to ptx8_shb as original signals. Since the row address signal addr_shb indicates the value K over eight Hpd periods, the 2K-th row of the pixel unit 4 becomes the target row of the reset B processing over the eight Hpd periods.

At a subsequent time t301_shb, the value of the row address signal addr_shb transitions from K to (K+1), and the 2K-th row of the pixel unit 4 enters an accumulation state. In the row in the accumulation state, the control signals PTX1 to PTX8 are set to the low level to accumulate a charge in the photoelectric converter PD.

Also at time t301_shb, the value of the row address signal addr_shb transitions from K to (K+1), and the non-accumulation processing of the (2(K+1))-th row and the (2(K+1)−1)-th row of the pixel unit 4 is canceled and the (2(K+1))-th row and the (2(K+1)−1)-th row of the pixel unit 4 become the target row of the reset B processing. The operations of the (2(K+1))-th row and the (2(K+1)−1)-th row of the pixel unit 4 are the same as the operation of the 2K-th row of the pixel unit 4, and a description thereof will be omitted.

Figure 9:
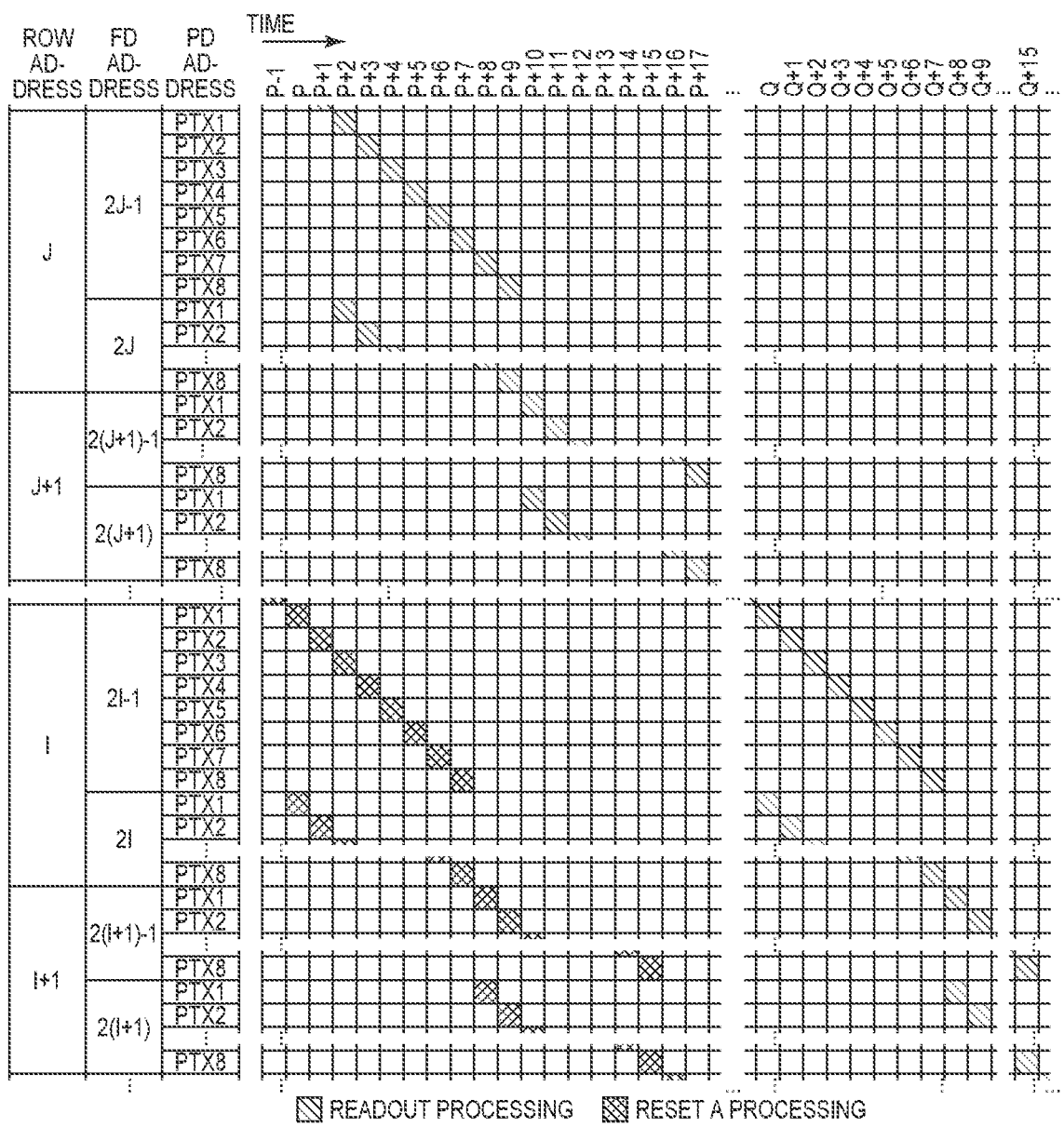
FIG. 9 is a timing chart illustrating transition of row addresses in a vertical scan of the photoelectric conversion device according to the first embodiment of the present invention.

Next, transition of row addresses in a vertical scan of the photoelectric conversion device according to the present embodiment will be described with reference to FIG. 9. FIG. 9 is a timing chart illustrating transition of row addresses in a vertical scan of the photoelectric conversion device according to the present embodiment.

During the period from time P to time P+7, the FD address (2I−1) and the FD address 2I become the target row of the reset A processing. The FD address (2I−1) and the FD address 2I are the same as the (2I−1)-th row and the 2I-th row of the pixel unit 4.

At time P, the photoelectric converter PD1 connected via the transfer transistor M1 receiving the control signal PTX1 is selected at the FD address (2I−1) and the FD address 2I, and the reset A processing is performed.

At a subsequent time P+1, the photoelectric converter PD2 connected via the transfer transistor M2 receiving the control signal PTX2 is selected at the FD address (2I−1) and the FD address 2I, and the reset A processing is performed.

Thereafter, similarly, during a period from time P+2 to time P+7, the photoelectric converters PD3 to PD8 are sequentially selected at the FD address (2I−1) and the FD address 2I, and the reset A processing is performed.

When the row address transitions to (I+1) at time P+8, the photoelectric converter PD1 connected via the transfer transistor M1 receiving the control signal PTX1 is selected at the FD address (2(I+1)−1) and the FD address (2(I+1)), and the reset A processing is performed.

Thereafter, similarly, during a period from time P+9 to time P+15, the photoelectric converters PD2 to PD8 are sequentially selected at the FD address (2(I+1)−1) and the FD address (2(I+1)), and the reset A processing is performed.

During a period from time P+2 to time P+9, the FD address (2J−1) and the FD address 2J become the target row of the readout processing.

At time P+2, at FD address (2J−1) and FD address 2J, the photoelectric converter PD1 connected via the transfer transistor M1 receiving the control signal PTX1 is selected and readout processing is performed.

Thereafter, similarly, during a period from time P+3 to time P+9, the photoelectric converters PD2 to PD8 are sequentially selected at the FD address (2J−1) and the FD address 2J, and readout processing is performed.

When the row address transitions to J+1 at time P+10, the photoelectric converter PD1 connected via the transfer transistor M1 receiving the control signal PTX1 is selected at the FD address (2(J+1)−1) and the FD address (2(J+1)), and the readout processing is performed.

Thereafter, similarly, the photoelectric converters PD2 to PD8 are sequentially selected at the FD address (2(J+1)−1) and the FD address (2(J+1)) during a period from time P+11 to time P+17, and the readout processing is performed.

During a period from time Q to time Q+7, the FD address (2I−1) and the FD address 2I become the target row of the readout processing.

At time Q, at FD address (2I−1) and FD address 2I, the photoelectric converter PD1 connected via the transfer transistor M1 receiving the control signal PTX1 is selected and readout processing is performed. That is, at the FD address (2I−1) and the FD address 2I, the length of the exposure period of the photoelectric converter PD1 is Q-P.

Thereafter, similarly, during a period from time Q+1 to time Q+7, the photoelectric converters PD2 to PD8 are sequentially selected at the FD address (2I−1) and the FD address 2I, and the readout processing is performed.

Here, since the start timing of the readout processing and the start timing of the reset A processing may be controlled in units of one Hpd as described with reference to FIG. 5, the exposure time of the photoelectric converter PD may be controlled in units of one Hpd. The same applies to the reset B processing.

The timing of the level transition of the control signals ptx1_rd to ptx8_rd in one Hpd period and the timing of the level transition of the control signals ptx1_sha to ptx8_sha in one Hpd period may be independently set as described with reference to FIG. 6. Therefore, the exposure time of the photoelectric converter PD may be controlled in units of one Hpd or less. The same applies to the control signals ptx1_shb to ptx8_shb.

As described above, in the present embodiment, the horizontal synchronization signal Hpd of the cycle pd in which the selection of the photoelectric converter PD to be subjected to the readout processing and the reset processing is switched and the horizontal synchronization signal Hfd of the cycle fd in which the selection of the floating diffusion FD to be subjected to the processing is switched are used. Further, as the horizontal synchronization signal Hfd, a horizontal synchronization signal Hfd_RD, a horizontal synchronization signal Hfd_SHA, and a horizontal synchronization signal Hfd_SHB which are independent from each other in the readout processing, the reset A processing, and the reset B processing are used. Since the generation timings of these horizontal synchronization signals Hfd may be controlled in units of one Hpd, the setting unit of the update timings of the row address signal addr_rd and the row address signals addr_sha and addr_shb are also one Hpd. That is, the setting unit of the update timings of the row address signals addr_rd, addr_sha, and addr_shb is equal to the length of one cycle of the cycle pd. Thus, the length of the exposure period of the photoelectric converter PD may be controlled in units of one Hpd.

In the present embodiment, the count signals cnt_hpd_rd, cnt_hpd_sha, and cnt_hpd_shb for counting the horizontal synchronization signal are included. Thus, the control signals ptx1_rd to ptx8_rd, ptx1_sha to ptx8_sha and the ptx1_shb to ptx8_shb may be output in an arbitrary order. Further, it is also possible to control the exposure time in units of one Hpd or less by making the timing of the level transition of the control signals ptx1_rd to ptx8_rd, ptx1_sha to ptx8_sha and ptx1_shb to ptx8_shb independent in the one Hpd period.

Therefore, according to the present embodiment, the degree of freedom in setting the exposure time may be improved in the photoelectric conversion device including the pixel P including the plurality of photoelectric converters PD sharing the floating diffusion FD.

Second Embodiment

Figure 11:
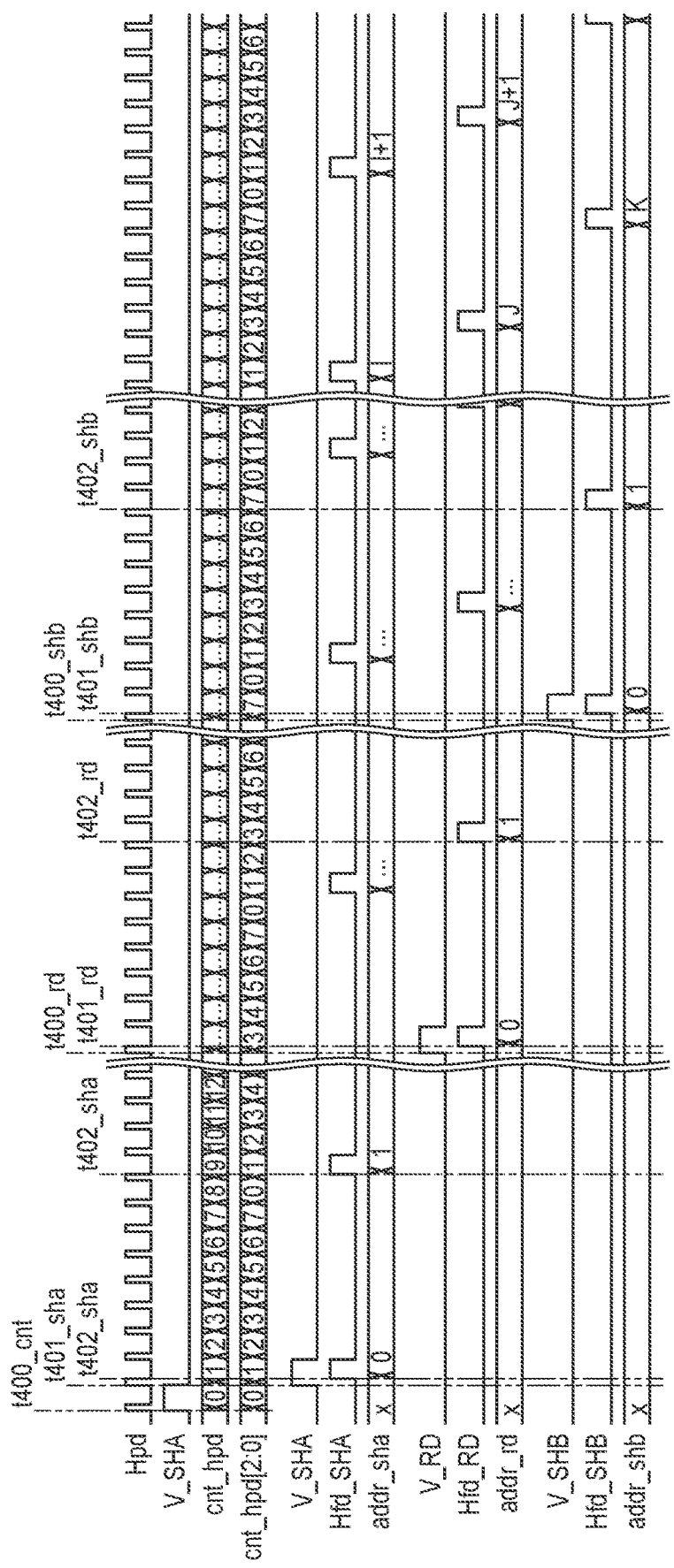
FIG. 11 is a timing chart illustrating an operation example of a readout row/reset row address generation unit in the photoelectric conversion device according to the second embodiment of the present invention.
Figure 12:
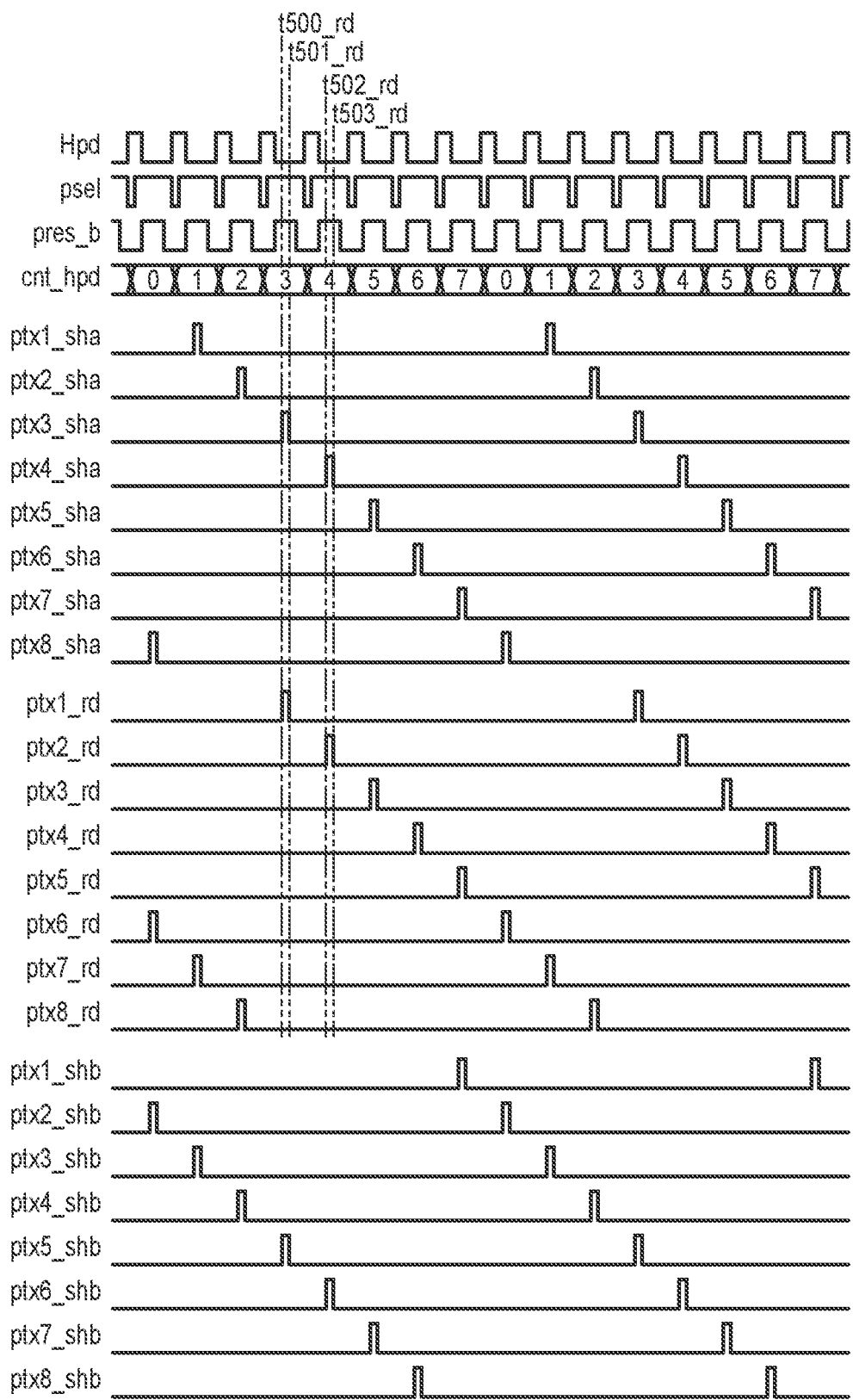
FIG. 12 is a timing chart illustrating an operation example of a vertical scanning timing control unit in the photoelectric conversion device according to the second embodiment of the present invention.

A photoelectric conversion device according to a second embodiment of the present invention will be described with reference to FIG. 10 to FIG. 12. The same components as those of the photoelectric conversion device according to the first embodiment are denoted by the same reference numerals, and the description thereof will be omitted or simplified.

The photoelectric conversion device according to the present embodiment is different from the photoelectric conversion device according to the first embodiment in the configuration of a counter that counts the horizontal synchronization signal Hpd.

First, a configuration example of the readout row/reset row address generation unit 22 in the photoelectric conversion device according to the present embodiment will be described with reference to FIG. 10. FIG. 10 is a block diagram illustrating a configuration example of a readout row/reset row address generation unit 22 in the photoelectric conversion device according to the present embodiment.

Figure 10:
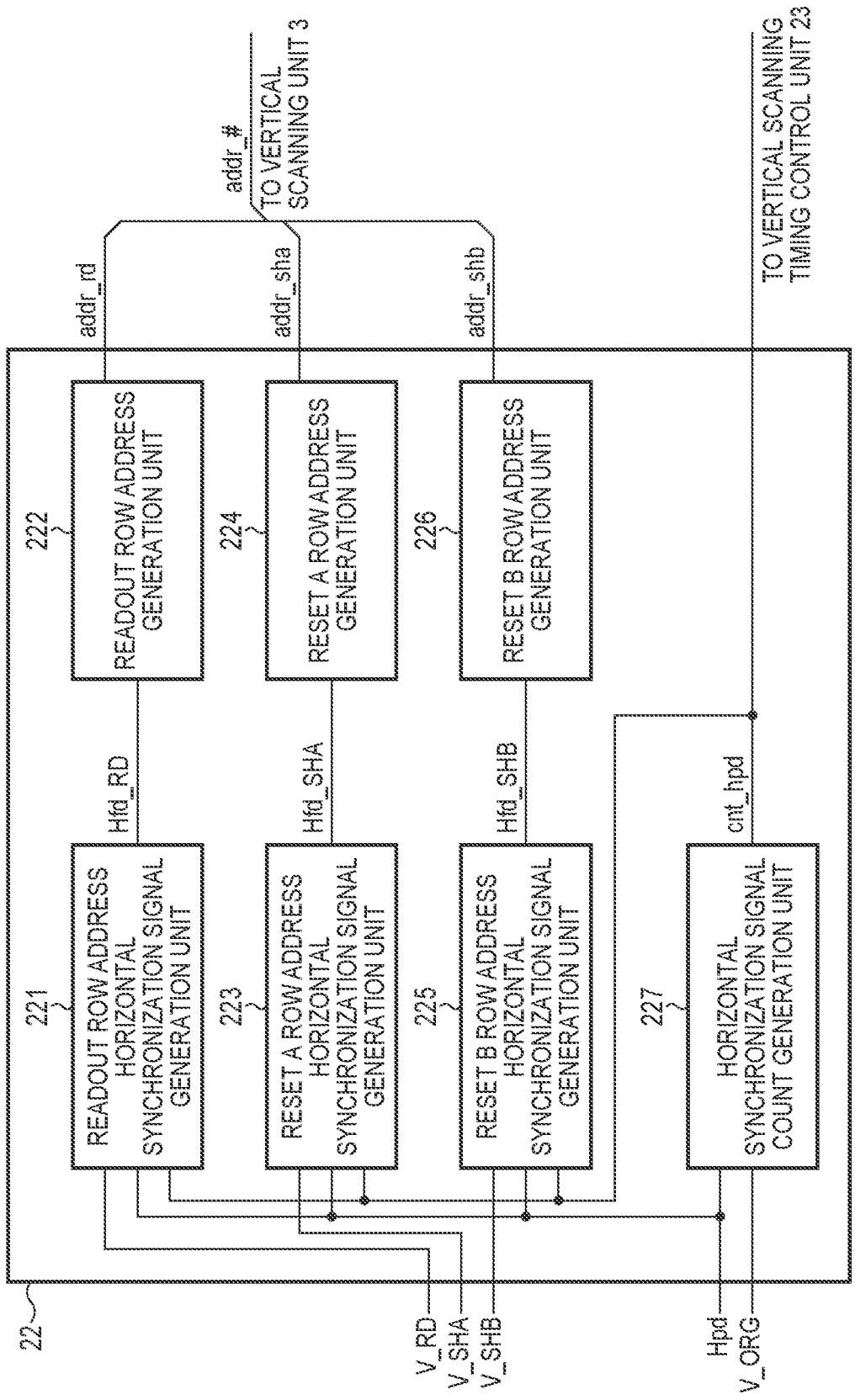
FIG. 10 is a block diagram illustrating a configuration example of a readout row/reset row address generation unit in a photoelectric conversion device according to a second embodiment of the present invention.

As illustrated in FIG. 10, the readout row/reset row address generation unit 22 in the photoelectric conversion device according to the present embodiment further includes a horizontal synchronization signal count generation unit 227. The horizontal synchronization signal count generation unit 227 receives the vertical synchronization signal V_ORG and the horizontal synchronization signal Hpd supplied from the synchronization signal generation unit 21, and generates a count signal cnt_hpd indicating the count value of the horizontal synchronization signal Hpd. The count signal cnt_hpd is output to the vertical scanning timing control unit 23, and is also supplied to the readout row address horizontal synchronization signal generation unit 221, the reset A row address horizontal synchronization signal generation unit 223, and the reset B row address horizontal synchronization signal generation unit 225.

In the present embodiment, the readout row address horizontal synchronization signal generation unit 221 does not generate the count signal cnt_hpd_rd. Similarly, the reset A row address horizontal synchronization signal generation unit 223 and the reset B row address horizontal synchronization signal generation unit 225 do not generate the count signal cnt_hpd_sha and the count signal cnt_hpd_shb.

The horizontal synchronization signal count generation unit 227 is not necessarily a part of the readout row/reset row address generation unit 22, and may be provided outside the readout row/reset row address generation unit 22. For example, the horizontal synchronization signal count generation unit 227 may be included in the synchronization signal generation unit 21. The count signal cnt_hpd may be shared by blocks other than the readout row/reset row address generation unit 22 and the vertical scanning timing control unit 23.

Next, an operation example of the readout row/reset row address generation unit 22 in the photoelectric conversion device according to the present embodiment will be described with reference to FIG. 11. FIG. 11 is a timing chart illustrating an operation example of the readout row/reset row address generation unit 22 in the photoelectric conversion device according to the present embodiment.

First, the operation of generating the count signal cnt_hpd will be described with reference to FIG. 11.

At time t400_cnt, the vertical synchronization signal V_ORG supplied from the synchronization signal generation unit 21 transitions from the low level to the high level. In response to the transition of the vertical synchronization signal V_ORG from the low level to the high level, the count signal cnt_hpd is initialized to 0. The value 0 is a preset value, and may be controlled by a register or the like.

At a subsequent time t401_cnt, the horizontal synchronization signal Hpd supplied from the synchronization signal generation unit 21 transitions from the low level to the high level. Then, in response to the transition of the horizontal synchronization signal Hpd to the high level, the value of the count signal cnt_hpd is counted up and transitions from 0 to 1. The count-up width does not necessarily have to be +1, and may be configured to transition to a specific value without counting up. Alternatively, the value of the row address signal addr_rd may be controlled by a register or the like. Thereafter, the value of the count signal cnt_hpd is counted up each time the horizontal synchronization signal Hpd transitions from the low level to the high level.

Next, an operation of generating the readout row address (row address signal addr_rd) will be described with reference to FIG. 11.

The row address signal addr_rd is generated by referring to the lower three bits of the count signal cnt_hpd. Note that the bits to be referred need not be the lower three bits, and may be controlled by a register or the like. Here, it is assumed that the timing corresponding to the value 3 of the lower three bits of the count signal cnt_hpd is the update timing of the row address signal addr_rd. The value 3 is a setting value that defines the update timing of the row address signal addr_rd.

At time t400_rd, the vertical synchronization signal V_RD supplied from the synchronization signal generation unit 21 transitions from the low level to the high level.

At a subsequent time t401_rd, the value of the lower three bits of the count signal cnt_hpd transitions to 3. When the value of the lower three bits of the count signal cnt_hpd transitions to 3, the horizontal synchronization signal Hfd_RD transitions from the low level to the high level. The timing at which the horizontal synchronization signal Hfd_RD transitions from the low level to the high level is not necessarily the timing corresponding to the value 3 of the lower three bits of the count signal cnt_hpd, and may be controlled by a register or the like.

Similarly, at time t401_rd, in response to the transition of the horizontal synchronization signal Hfd_RD from the low level to the high level, the value of the row address signal addr_rd is changed to 0. The value 0 is a preset value, and may be controlled by a register or the like.

At a subsequent time t402_rd, the value of the lower three bits of the count signal cnt_hpd transitions to 3. When the value of the lower three bits of the count signal cnt_hpd transitions to 3, the horizontal synchronization signal Hfd_RD transitions from the low level to the high level.

Also at time t402_rd, in response to the transition of the horizontal synchronization signal Hfd_RD from the low level to the high level, the value of the row address signal addr_rd is counted up and transitions from 0 to 1. Note that the count-up width is not necessarily +1, and may be configured to transition to a specific value without counting up. Alternatively, the value of the row address signal addr_rd may be controlled by a register or the like. Thereafter, the value of the row address signal addr_rd is counted up each time the horizontal synchronization signal Hfd_RD transitions from the low level to the high level.

Next, an operation of generating the reset A row address (row address signal addr_sha) will be described with reference to FIG. 11.

The row address signal addr_sha is generated by referring to the lower three bits of the count signal cnt_hpd. Note that the bits to be referred need not be the lower three bits, and may be controlled by a register or the like. Here, it is assumed that the timing corresponding to the value 1 of the lower three bits of the count signal cnt_hpd is the update timing of the row address signal addr_sha. The value 1 is a set value that defines the update timing of the row address signal addr_sha.

At time t400_sha, the vertical synchronization signal V_SHA supplied from the synchronization signal generation unit 21 transitions from the low level to the high level.

At a subsequent time t401_sha, the value of the lower three bits of the count signal cnt_hpd transitions to 1. In response to the transition of the value of the lower three bits of the count signal cnt_hpd to 1, the horizontal synchronization signal Hfd_SHA transitions from the low level to the high level. The timing at which the horizontal synchronization signal Hfd_SHA transitions from the low level to the high level is not necessarily the timing corresponding to the value 1 of the lower three bits of the count signal cnt_hpd, and may be controlled by a register or the like.

Also at time t401_sha, the horizontal synchronization signal Hfd_SHA is changed from the low level to the high level, and the value of the row address signal addr_sha is changed to 0. The value 0 is a preset value, and may be controlled by a register or the like.

At a subsequent time t402_sha, the value of the lower three bits of the count signal cnt_hpd transitions to 1. In response to the transition of the value of the lower three bits of the count signal cnt_hpd to 1, the horizontal synchronization signal Hfd_SHA transitions from the low level to the high level.

Also at time t402_sha, in response to the transition of the horizontal synchronization signal Hfd_SHA from the low level to the high level, the value of the row address signal addr_sha is counted up and transitions from 0 to 1. Note that the count-up width is not necessarily +1, and may be configured to transition to a specific value without counting up. Alternatively, the value of the row address signal addr_sha may be controlled by a register or the like. Thereafter, the value of the row address signal addr_sha is counted up each time the horizontal synchronization signal Hfd_SHA transitions from the low level to the high level.

Next, an operation of generating the reset B row address (row address signal addr_shb) will be described with reference to FIG. 11.

The row address signal addr_shb is generated by referring to the lower three bits of the count signal cnt_hpd. Note that the bits to be referred need not be the lower three bits, and may be controlled by a register or the like. Here, it is assumed that the timing corresponding to the value 7 of the lower three bits of the count signal cnt_hpd is the update timing of the row address signal addr_shb. The value 7 is a setting value that defines the update timing of the row address signal addr_shb.

At time t400_shb, the vertical synchronization signal V_SHB supplied from the synchronization signal generation unit 21 transitions from the low level to the high level.

At a subsequent time t401_shb, the value of the lower three bits of the count signal cnt_hpd transitions to 7. When the value of the lower three bits of the count signal cnt_hpd transitions to 7, the horizontal synchronization signal Hfd_SHB transitions from the low level to the high level. The timing at which the horizontal synchronization signal Hfd_SHB transitions from the low level to the high level is not necessarily the timing corresponding to the value 7 of the lower three bits of the count signal cnt_hpd, and may be controlled by a register or the like.

Also at time t401_shb, the horizontal synchronization signal Hfd_SHB transitions from the low level to the high level, and the value of the row address signal addr_shb transitions to 0. The value 0 is a preset value, and may be controlled by a register or the like.

At the subsequent time t402_shb, the value of the lower three bits of the count signal cnt_hpd transitions to 7. When the value of the lower three bits of the count signal cnt_hpd transitions to 7, the horizontal synchronization signal Hfd_SHB transitions from the low level to the high level.

Similarly, at time t402_shb, in response to the transition of the horizontal synchronization signal Hfd_SHB from the low level to the high level, the value of the row address signal addr_shb is counted up and transitions from 0 to 1. Note that the count-up width is not necessarily +1, and may be configured to transition to a specific value without counting up. Alternatively, the value of the row address signal addr_shb may be controlled by a register or the like. Thereafter, the value of the row address signal addr_shb is counted up each time the horizontal synchronization signal Hfd_SHB transitions from the low level to the high level.

Next, an operation example of the vertical scanning timing control unit 23 in the photoelectric conversion device according to the present embodiment will be described with reference to FIG. 12. FIG. 12 is a timing chart illustrating an operation example of the vertical scanning timing control unit 23 in the photoelectric conversion device according to the present embodiment.

The vertical scanning timing control unit 23 generates control signals psel, pres_b, ptx1_rd to ptx8_rd, ptx1_sha to ptx8_sha and ptx1_shb to ptx8_shb, and outputs them to the vertical scanning unit 3. The vertical scanning timing control unit 23 generates a readout row memory unit control signal, a reset row memory unit control signal, and a non-accumulation row memory unit control signal, and outputs them to the vertical scanning unit 3. These signals are signals for controlling the driving timing of the vertical scanning unit 3.

The control signal psel and the control signal pres_b transition to the high level and transition to the low level during one Hpd period from the transition of the horizontal synchronization signal Hpd to the high level to the next transition to the high level. The one Hpd period is a period pd in which the selection of the photoelectric converters PD1 to PD8 is switched. The timing at which the levels of the control signal psel and the control signal pres_b change follows a predetermined set value. The set value may be controlled by a register or the like.

The control signals ptx1_rd to ptx8_rd transition to the high level and to the low level during a certain one Hpd period in eight Hpd periods from the time when the count value of the count signal cnt_hpd transitions to 3 to the time when the count value of the count signal cnt_hpd transitions to 3 next. The eight Hpd periods correspond to a period fd in which the selection of the floating diffusion FD is switched. The timing at which the levels of the control signals ptx1_rd to ptx8_rd change follows a preset value. The set value may be controlled by a register or the like.

When the value of the count signal cnt_hpd is 3, the control signal ptx1_rd transitions to the high level at time t500_rd, and transitions to the low level at subsequent time t501_rd. When the value of the count signal cnt_hpd is not 3, the control signal ptx1_rd maintains the low level.

Similarly, when the value of the count signal cnt_hpd is 4, the control signal ptx2_rd transitions to the high level at time t502_rd, and transitions to the low level at a subsequent time t503_rd. When the value of the count signal cnt_hpd is not 4, the control signal ptx2_rd maintains the low level.

The control signals ptx3_rd to ptx8_rd sequentially perform the same operation. Note that the value of the count signal cnt_hpd at the time when the level of the control signal ptx1_rd transitions is not necessarily 3, and the timing at which the level of the control signal ptx1_rd transitions may be controlled by a register or the like. The same applies to the control signals ptx2_rd to ptx8_rd. Further, it is not necessary that the levels of the control signals ptx1_rd to ptx8_rd transition during one Hpd period different from each other, and the levels of a plurality of control signals ptx#_rd (# is an integer of 1 to 8) may transition during the same one Hpd period.

The control signals ptx1_sha to ptx8_sha transition to the high level and to the low level during a certain one Hpd period in eight Hpd periods from the time when the count value of the count signal cnt_hpd transitions to 1 to the time when the count value of the count signal cnt_hpd transitions to 1 next. The operation during the one Hpd period is the same as the operation of the control signals ptx1_rd to ptx8_rd.

The control signals ptx1_shb to ptx8_shb transition to the high level and to the low level during a certain one Hpd period in eight Hpd periods from the time when the count value of the count signal cnt_hpd transitions to 7 to the time when the count value of the count signal cnt_hpd transitions to 7 next. The operation during the one Hpd period is the same as the operation of the control signals ptx1_rd to ptx8_rd.

As described above, in the present embodiment, the count signal cnt_hpd is used instead of the count signals cnt_hpd_rd, cnt_hpd_sha and cnt_hpd_shb as the output signals of the counter that counts the horizontal synchronization signal Hpd.

Therefore, according to the present embodiment, since it is not necessary to control a plurality of counters, the circuit scale can be reduced in addition to the effect of the first embodiment.

Third Embodiment

A photoelectric conversion device according to a third embodiment of the present invention will be described with reference to FIG. 13 to FIG. 14. The same components as those of the photoelectric conversion devices according to the first and second embodiments are denoted by the same reference numerals, and the description thereof will be omitted or simplified.

The photoelectric conversion device according to the present embodiment is different from the photoelectric conversion device according to the first embodiment in the configuration of a counter that counts the horizontal synchronization signal Hpd.

First, a configuration example of the pixel P in the photoelectric conversion device according to the present embodiment will be described with reference to FIG. 13. FIG. 13 is a circuit diagram illustrating a configuration example of a pixel P in the photoelectric conversion device according to the present embodiment. FIG. 13 illustrates only the configuration of the pixels P (m, n) arranged in the m-th column and the n-th row of the pixels P constituting the pixel unit 4, but the same applies to other pixels P.

Each pixel P may include photoelectric converters PD1$a$ to PD8$a$ and PD1$b$ to PD8$b$, transfer transistors M1$a$ to M8$a$ and M1$b$ to M8$b$, a reset transistor M9, an amplifier transistor M10, and a select transistor M11. The photoelectric converter PD1$a$ and the photoelectric converter PD1$b$ form a set sharing one microlens, and receive light passing through different pupil regions. The same applies to each set of the photoelectric converters PD2$a$ and PD2$b$ to PD8$a$ and PD8$b$. The transfer transistors M1$a$ to M8$a$ and M1$b$ to M8$b$ are provided corresponding to the photoelectric converters PD1$a$ to PD8$a$ and PD1$b$ to PD8$b$, respectively. That is, the photodiode constituting the photoelectric converter PD1$a$ has an anode connected to the ground node and a cathode connected to a source of the transfer transistor M1$a$. The photodiode constituting the photoelectric converter PD has an anode connected to the ground node and a cathode connected to a source of the transfer transistor M1$b$. The same applies to the photoelectric converters PD2$a$ and PD2$b$ to PD8$a$ and PD8$b$. Drains of the transfer transistors M1$a$ to M8$a$ and M1$b$ to M8$b$ are connected to a floating diffusion FD.

Figure 13:
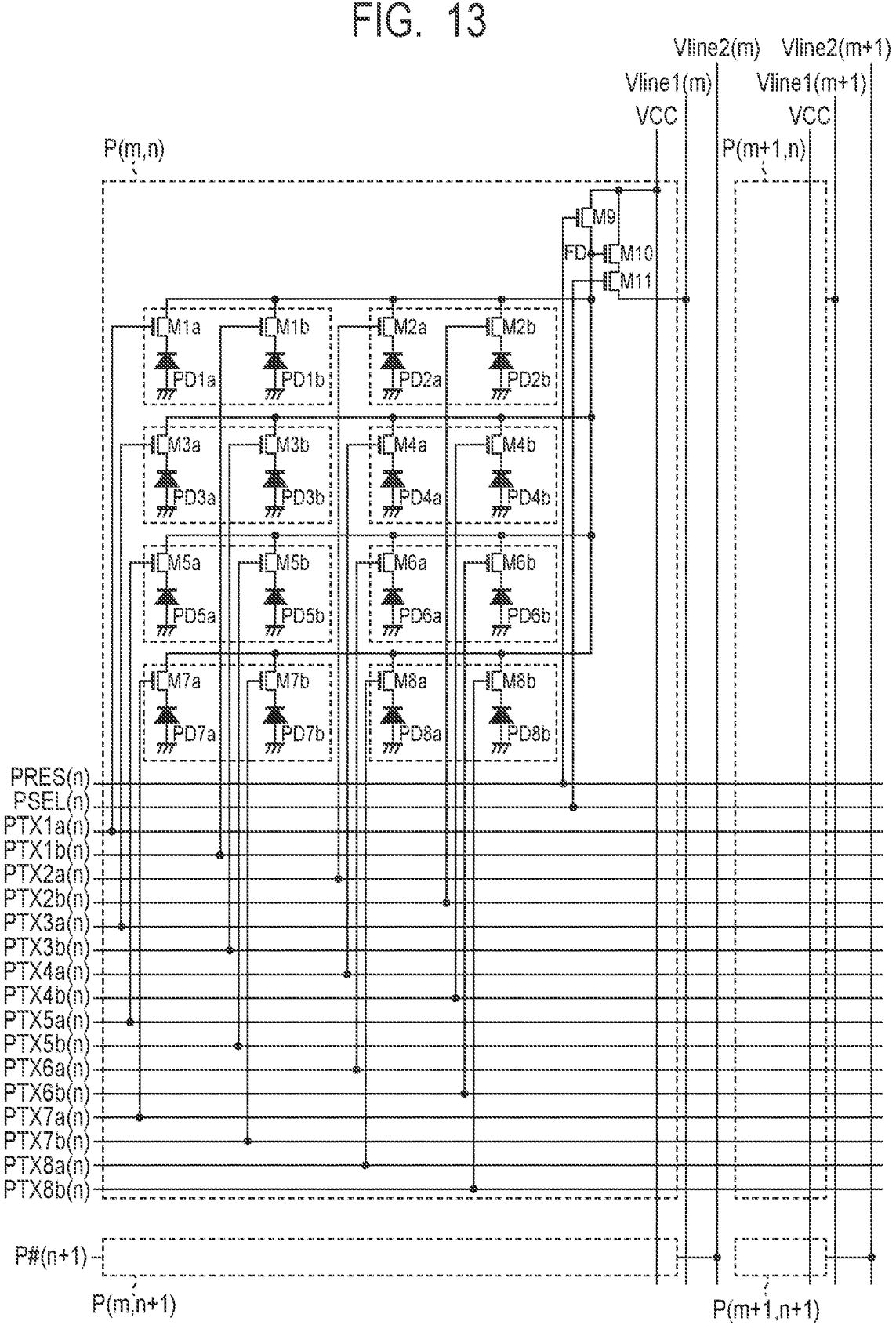
FIG. 13 is a circuit diagram illustrating a configuration example of a pixel in a photoelectric conversion device according to a third embodiment of the present invention.

In the case of the pixel configuration illustrated in FIG. 13, each of the control lines arranged in each row of the pixel unit 4 includes 16 transfer gate signal lines corresponding to each of the transfer transistors M1$a$ and M1$b$ to M8$a$ and M8$b$, a reset signal line, and a select signal line. Each transfer gate signal line in the n-th row supplies a corresponding control signal among the control signals PTX1$a$ (n) and PTX1$b$ (n) to PTX8$a$ (n) and PTX8$b$ (n) to a gate of a corresponding transfer transistor among the transfer transistors M1$a$ and M1$b$ to M8$a$ and M8$b$. For example, the transfer gate signal line corresponding to the transfer transistor M1$a$ of the pixel P of the n-th row supplies the control signal PTX1$a$ (n) output from the vertical scanning unit 3 to the gate of the transfer transistor M1$a$ of the pixel P of the n-th row. The transfer gate signal line corresponding to the transfer transistor M1$b$ of the pixel P of the n-th row supplies the control signal PTX1$b$ (n) output from the vertical scanning unit 3 to the gates of the transfer transistors M1$b$ of the pixels P of the n-th row. The same applies to the transfer gate signal lines corresponding to the transfer transistors M2$a$ and M2$b$ to M8$a$ M8$b$ of the pixels P of the n-th row. The reset signal line of the n-th row supplies the control signal PRES (n) output from the vertical scanning unit 3 to the gates of the reset transistors M9 of the pixels P of the n-th row. The select signal line of the n-th row supplies the control signal PSEL (n) output from the vertical scanning unit 3 to the gates of the select transistors M11 of the pixels P of the n-th row. A common control signal is supplied from the vertical scanning unit 3 to the pixels P in the same row.

Next, an operation example of the readout row/reset row address generation unit 22 in the photoelectric conversion device according to the present embodiment will be described with reference to FIG. 14. FIG. 14 is a timing chart illustrating an operation example of the readout row/reset row address generation unit 22 in the photoelectric conversion device according to the present embodiment. The description of the generation operation of the row address signal addr_shb will be omitted.

In the present embodiment, two kinds of setting values are provided for the timing when the value of the count signal cnt_hpd_# (# is rd or sha) is initialized to 0, and one of the setting values is selected and used for each row address. The setting values may be three or more types, or may be controlled by a register or the like.

First, an operation of generating the readout row address (row address signal addr_rd) will be described with reference to FIG. 14. In the present embodiment, it is assumed that the count signal cnt_hd_rd has two set values of 7 and 15 as the timing at which the count signal cnt_hd_rd is initialized to 0. The timing corresponding to these set values is the update timing of the row address signal addr_rd. However, the timing at which the count signal cnt_hd_rd is initialized to the value 0 is not necessarily the values of 7 and 15.

At time t600_rd, when the horizontal synchronization signal Hpd transitions from the low level to the high level, the count value of the count signal cnt_hpd_rd is 7. The count value of the count signal cnt_hpd_rd is initialized to 0 in response to the transition of the horizontal synchronization signal Hpd from the low level to the high level. When the count value of the count signal cnt_hpd_rd is initialized to 0, the horizontal synchronization signal Hfd_RD transitions from the low level to the high level. As a result, the value of the row address signal addr_rd counts up and transitions to J.

At a subsequent time t601_rd, when the horizontal synchronization signal Hpd transitions from the low level to the high level, the count value of the count signal cnt_hpd_rd is counted up to 7 again. The count value of the count signal cnt_hpd_rd is initialized to 0 in response to the transition of the horizontal synchronization signal Hpd from the low level to the high level. When the count value of the count signal cnt_hpd_rd is initialized to 0, the horizontal synchronization signal Hfd_RD transitions from the low level to the high level. As a result, the value of the row address signal addr_rd counts up and transitions from J to J+1.

At a subsequent time t602_rd, when the horizontal synchronization signal Hpd transitions from the low level to the high level, the count value of the count signal cnt_hpd_rd is counted up to 15. The count value of the count signal cnt_hpd_rd is initialized to 0 in response to the transition of the horizontal synchronization signal Hpd from the low level to the high level. When the count value of the count signal cnt_hpd_rd is initialized to 0, the horizontal synchronization signal Hfd_RD transitions from the low level to the high level. As a result, the value of the row address signal addr_rd counts up and transitions from J+1 to J+2.

In this way, in the readout scan, a vertical scan is performed while switching the period fd for switching the floating diffusion FD between eight Hpd and sixteen Hpd for each row address.

Next, an operation of generating the reset A row address (row address signal addr_sha) will be described with reference to FIG. 14. In the present embodiment, it is assumed that the count signal cnt_hd_sha has two set values of 7 and 15 as timings at which the count signal cnt_hd_sha is initialized to 0. The timing corresponding to these set values is the update timing of the row address signal addr_sha. However, the timing at which the value of the count signal cnt_hd_sha is initialized to 0 is not necessarily the values of 7 and 15.

At time t600_sha, when the horizontal synchronization signal Hpd transitions from the low level to the high level, the count value of the count signal cnt_hpd_sha is 7. The count value of the count signal cnt_hpd_sha is initialized to 0 in response to the transition of the horizontal synchronization signal Hpd from the low level to the high level. When the count value of the count signal cnt_hpd_sha is initialized to 0, the horizontal synchronization signal Hfd_SHA transitions from the low level to the high level. As a result, the value of the row address signal addr_sha is counted up and transitions to I.

At a subsequent time t601_sha, when the horizontal synchronization signal Hpd transitions from the low level to the high level, the count value of the count signal cnt_hpd_sha is counted up to 7 again. The count value of the count signal cnt_hpd_sha is initialized to 0 in response to the transition of the horizontal synchronization signal Hpd from the low level to the high level. When the count value of the count signal cnt_hpd_sha is initialized to 0, the horizontal synchronization signal Hfd_SHA transitions from the low level to the high level. As a result, the value of the row address signal addr_sha counts up and transitions from I to I+1.

At a subsequent time t602_sha, when the horizontal synchronization signal Hpd transitions from the low level to the high level, the count value of the count signal cnt_hpd_sha is counted up to 15. The count value of the count signal cnt_hpd_sha is initialized to 0 in response to the transition of the horizontal synchronization signal Hpd from the low level to the high level. When the count value of the count signal cnt_hpd_sha is initialized to 0, the horizontal synchronization signal Hfd_SHA transitions from the low level to the high level. As a result, the value of the row address signal addr_sha counts up and transitions from I+1 to I+2.

In this way, in the reset scan, the vertical scan is performed while switching the cycle fd for switching the floating diffusion FD between eight Hpd and sixteen Hpd for each row address.

Next, an operation example of the pixel control signal generation unit 324 and the pixel unit 4 in the photoelectric conversion device according to the present embodiment will be described with reference to FIG. 15A to FIG. 15C. FIG. 15A to FIG. 15C are timing charts illustrating operation examples of the pixel control signal generation unit 324 and the pixel unit 4 in the photoelectric conversion device according to the present embodiment. In the present embodiment, each of the control signals PTX# is divided into a control signal PTX#a and a control signal PTX#b (# is an integer from 1 to 8).

First, an operation of the pixel control signal generation unit 324 and the pixel unit 4 in the readout processing will be described with reference to FIG. 15A and FIG. 15C.

It is assumed that the value of the row address signal addr_rd transitions from (J−1) to J at time t700_rd. As a result, the 2J-th row and the (2J−1)-th row of the pixel unit 4 become the target row of the readout processing.

The pixel control signals output to the 2J-th row of the pixel unit 4 are control signals PSEL(2J), PRES(2J), PTX1a (2J) to PTX8a(2J), and PTX1b (2J) to PTX8b (2J). The control signal PSEL (2J) is generated by the pixel control signal generation unit 324 using the control signal psel as an original signal. The control signal PRES (2J) is generated by the pixel control signal generation unit 324 using the control signal pres_b as an original signal. The control signals PTX1a (2J) to PTX8a (2J) are generated by the pixel control signal generation unit 324 using the control signals ptx1a_rd to ptx8a_rd as original signals. The control signals PTX1b (2J) to PTX8b (2J) are generated by the pixel control signal generation unit 324 using the control signals ptx1b_rd to ptx8b_rd as original signals. Since the value of the row address signal addr_rd indicates J over eight Hpd periods, the 2J-th row of the pixel unit 4 becomes the target row of the readout processing over the eight Hpd periods.

At a subsequent time t701_rd, the control signal ptx1a and the control signal ptx1b transition from the low level to the high level, and at the subsequent time t702_rd, the control signal ptx1a and the control signal ptx1b transition from the high level to the low level. Thereafter, the same operation is performed for eight Hpd.

When the value of the row address signal addr_rd transitions from J to (J+1) at the subsequent time t703_rd, the 2J-th row of the pixel unit 4 becomes a non-accumulation row to be subjected to the non-accumulation processing, and the (2(J+1))-th row and the (2(J+1)−1)-th row of the pixel unit 4 become a row to be subjected to the readout processing. In the non-accumulation row, the control signals PTX1a to PTX8a, the control signals PTX1b to PTX8b, and the control signal PRES are set to the high level to maintain the photoelectric converter PD and the floating diffusion FD in the reset state. Since the value of the row address signal addr_rd indicates J+1 over sixteen Hpd periods from time t703_rd to time t708_rd, the 2(J+1)-th row of the pixel unit 4 becomes the target row of the readout processing over the sixteen Hpd periods.

At a subsequent time t704_rd, the control signal ptx1a transitions from the low level to the high level, and at a subsequent time t705_rd, the control signal ptx1a transitions from the high level to the low level. At a subsequent time t706_rd, the control signal ptx1a and the control signal ptx1b transition from the low level to the high level, and at a subsequent time t707_rd, the control signal ptx1a and the control signal ptx1b transition from the high level to the low level. Thereafter, the same operation is performed every two Hpd over sixteen Hpd.

Next, operations of the pixel control signal generation unit 324 and the pixel unit 4 in the reset A processing will be described with reference to FIG. 15A and FIG. 15B.

It is assumed that the value of the row address signal addr_sha transitions from (I−1) to I at time t700_sha. Thus, the 2I-th row and the (2I−1)-th row of the pixel unit 4 become the target row of the reset A processing.

The pixel control signals output to the 2I-th row of the pixel unit 4 are control signals PSEL(2I), PRES(2I), PTX1a (2I) to PTX8a(2I), and PTX1b (2I) to PTX8b (2I). Of these, the control signal PSEL (2I) is fixed to the low level, and the control signal PRES (2I) is fixed to the high level. The control signals PTX1a (2I) to PTX8a (2I) are generated by the pixel control signal generation unit 324 using the control signals ptx1a_sha to ptx8a_sha as original signals. The control signals PTX1b (2I) to PTX8b (2I) are generated by the pixel control signal generation unit 324 using the control signals ptx1b_sha to ptx8b_sha as original signals. Since the value of the row address signal addr_sha indicates I over sixteen Hpd periods from time t700_sha to time t705_sha, the 2I-th row of the pixel unit 4 becomes the target row of the reset A processing over the sixteen Hpd periods.

At a subsequent time t701_sha, the control signal ptx1a transitions from the low level to the high level, and at a subsequent time t702_sha, the control signal ptx1a transitions from the high level to the low level. At a subsequent time t703_sha, the control signal ptx1a and the control signal ptx1b transition from the low level to the high level, and at a subsequent time t704_sha, the control signal ptx1a and the control signal ptx1b transition from the high level to the low level. Thereafter, the same operation is performed every two Hpd over sixteen Hpd.

When the value of the row address signal addr_sha transitions from I to (I+1) at a subsequent time t705_sha, the 2I-th row of the pixel unit 4 enters the accumulation state, and the non-accumulation processing of the (2(I+1))-th row and the (2(I+1)−1)-th row of the pixel unit 4 is canceled. Thus, the (2(I+1))-th row and the (2(I+1)−1)-th row of the pixel unit 4 become the target row of the reset A processing. Since the value of the row address signal addr_sha indicates (I+1) over eight Hpd periods from time t705_sha to time t708_sha, the 2(I+1)-th row of the pixel unit 4 becomes the target row of the reset A processing over the eight Hpd periods.

At a subsequent time t706_sha, the control signal ptx1a and the control signal ptx1b transition from the low level to the high level, and at a subsequent time t707_sha, the control signal ptx1a and the control signal ptx1b transition from the high level to the low level. Thereafter, the same operation is performed for eight Hpd.

Figure 16A:
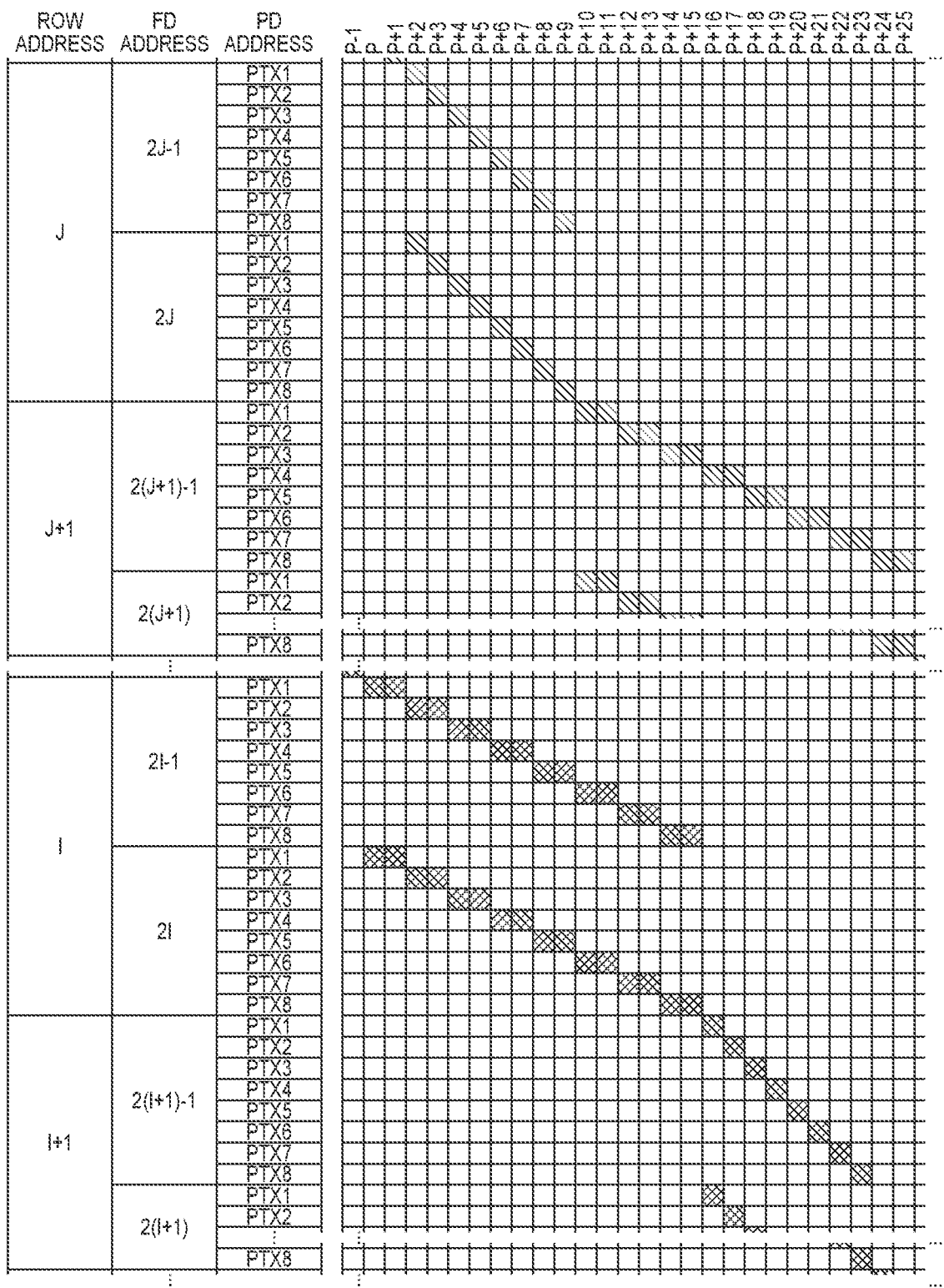
FIG. 16A and FIG. 16B are timing charts illustrating transition of row addresses in a vertical scan of the photoelectric conversion device according to the third embodiment of the present invention.
Figure 16B:
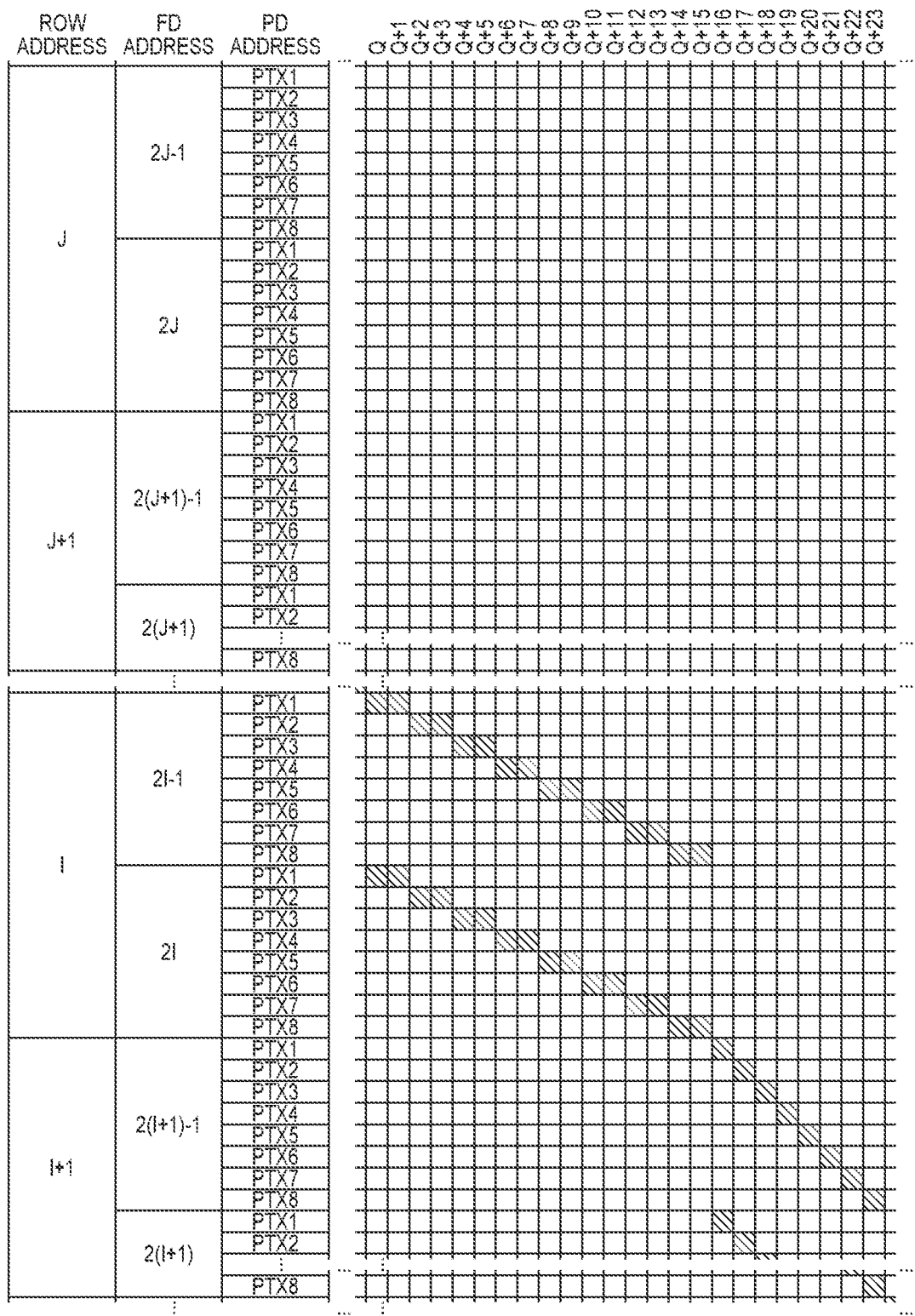

Next, transition of row addresses in a vertical scan of the photoelectric conversion device according to the present embodiment will be described with reference to FIG. 16A and FIG. 16B. FIG. 16A and FIG. 16B are timing charts for explaining transition of row addresses in a vertical scan of the photoelectric conversion device according to the present embodiment.

During the period from time P to time P+15, the FD address (2I−1) and the FD address 2I become the target row of the reset A processing. The FD address (2I−1) and the FD address (2I) are the same as those in the (2I−1)-th row and the 2I-th row of the pixel unit 4.

At time P, at FD addresses (2I−1) and 2I, the photoelectric converter PD1a connected via the transfer transistor M1a receiving the control signal PTX1a is selected, and the reset A processing is performed. At time P+1, at FD addresses (2I−1) and 2I, the photoelectric converters PD1a and PD1b connected via transfer transistors M1a and M1b receiving the control signals PTX1a and PTX1b are selected, and the reset A processing is performed.

At time P+2, at FD addresses (2I−1) and 2I, the photoelectric converter PD2a connected via the transfer transistor M2a receiving the control signal PTX2a is selected, and the reset A processing is performed. During a subsequent period to time P+3, at FD addresses (2I−1) and 2I, the photoelectric converters PD2a and PD2b connected via the transfer transistors M2a and M2b receiving the control signals PTX2a and PTX2b are selected, and the reset A processing is performed.

Thereafter, similarly, in the period from time P+4 to time P+15, at FD addresses (2I−1) and 2I, the photoelectric converters PD3a and PD3b to PD8a and PD8b are sequentially selected, and the reset A processing is performed.

In a subsequent time P+16, the row address transitions to I+1. During the period from time P+16 to time P+23, the FD address (2(I+1)−1) and the FD address (2(I+1)) are subject to the reset A processing.

At time P+16, at FD addresses (2(I+1)−1) and (2(I+1)), the photoelectric converters PD1a and PD1b connected via transfer transistors M1a and M1b receiving the control signals PTX1a and PTX1b are selected, and the reset A processing is performed.

Thereafter, similarly, in a period from time P+17 to time P+23, at FD addresses (2(I+1)−1) and (2(I+1)), the photoelectric converters PD2a, PD2b to PD8a, and PD8b are sequentially selected, and the reset A processing is performed.

During the period from time P+2 to time P+9, the FD address (2J−1) and the FD address 2J become the target row of the readout processing.

At time P+2, at FD address (2J−1) and FD address 2J, the photoelectric converters PD1a and PD1b connected via transfer transistors M1a and M1b receiving the control signals PTX1a and PTX1b are selected and readout processing is performed.

Thereafter, similarly, during the period from time P+3 to time P+9, at the FD address (2J−1) and the FD address 2J, the photoelectric converters PD2a and PD2b to PD8a and PD8b are sequentially selected, and the readout processing is performed.

At a subsequent time P+10, the row address transitions from J to J+1. During the period from time P+10 to time P+25, the FD address (2(J+1)−1) and the FD address (2(J+1)) become the target row of the readout processing.

At time P+10, at FD addresses (2(J+1)−1) and (2(J+1)), the photoelectric converter PD1a connected via the transfer transistor M1a that receives the control signal PTX1a is selected and readout processing is performed. At a subsequent time P+11, at FD addresses (2(J+1)−1) and (2(J+1)), the photoelectric converters PD1a and PD1b connected via the transfer transistors M1a and M1b receiving the control signals PTX1a and PTX1b are selected, and readout processing is performed.

Thereafter, similarly, during the period from time P+12 to time P+25, at the FD address (2(J+1)−1) and the FD address (2(J+1)), the photoelectric converters PD2a and PD2b to PD8a and PD8b are sequentially selected, and the readout processing is performed.

During the period from time Q to time Q+15, the FD address (2I−1) and the FD address 2I become the target row of the readout processing.

At time Q, at FD address (2I−1) and FD address 2I, the photoelectric converter PD1a connected via the transfer transistor M1a receiving the control signal PTX1a is selected and readout processing is performed. At a subsequent time Q+1, at the FD address (2I−1) and the FD address 2I, the photoelectric converters PD1a and PD1b connected via the transfer transistors M1a and M1b receiving the control signals PTX1a and PTX1b are selected, and the readout processing is performed. That is, in the FD address (2I−1) and the FD address 2I, the length of the exposure period of the photoelectric converters PD1a and PD1b is Q−P.

Thereafter, similarly, during the period from time Q+2 to time Q+15, at the FD address (2I−1) and the FD address 2I, the photoelectric converters PD2a and PD2b to PD8a and PD8b are sequentially selected, and the readout processing is performed.

As described with reference to FIG. 14, by providing two kinds of setting values for the timing at which the count signal cnt_hpd_# (# is rd or sha) is initialized to 0, a vertical scan with a higher degree of freedom may be realized.

As described above, according to the present embodiment, by changing the operation of the counter that counts the horizontal synchronization signal Hpd, it is possible to realize a vertical scan with a higher degree of freedom in which driving is switched in units of the floating diffusion FD, for example.

Therefore, according to the present embodiment, the degree of freedom in setting the exposure time may be improved in the photoelectric conversion device including the pixel P including the plurality of photoelectric converters PD sharing the floating diffusion FD.

Fourth Embodiment

A photoelectric conversion device according to a fourth embodiment of the present invention will be described with reference to FIG. 17 to FIG. 19B. The same components as those of the photoelectric conversion devices according to the first to third embodiments are denoted by the same reference numerals, and the description thereof will be omitted or simplified.

In the photoelectric conversion device according to the present embodiment, the configuration of the pixel unit 4 is the same as that of the third embodiment, but the configuration of the counter that counts the horizontal synchronization signal Hpd is different from that of the photoelectric conversion device according to the third embodiment.

Figure 17:
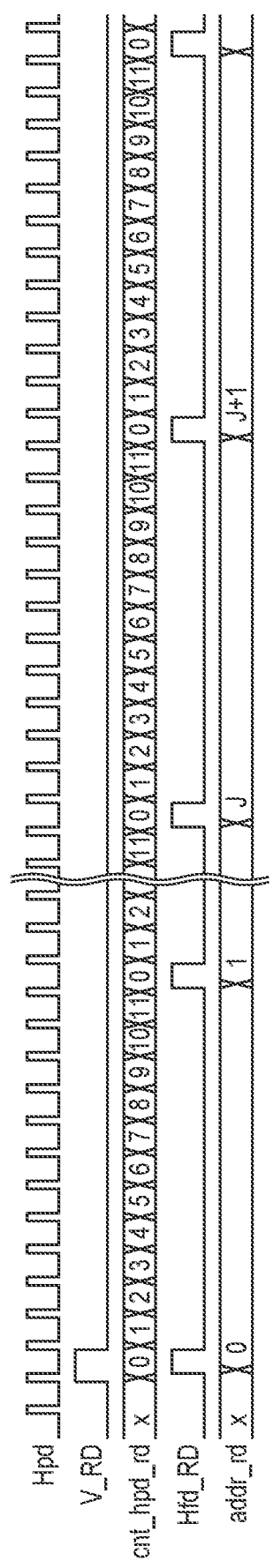
FIG. 17 is a timing chart illustrating an operation example of a readout row/reset row address generation unit in a photoelectric conversion device according to a fourth embodiment of the present invention.

First, an operation example of the readout row/reset row address generation unit 22 in the photoelectric conversion device according to the present embodiment will be described with reference to FIG. 17. FIG. 17 is a timing chart illustrating an operation example of the readout row/reset row address generation unit 22 in the photoelectric conversion device according to the present embodiment. Note that description of the generation operation of the row address signals addr_sha and addr_shb will be omitted.

In the present embodiment, one set value is provided for the timing at which the count value of the count signal cnt_hpd_rd is initialized to 0. In the third embodiment, as the timing at which the count signal cnt_hd_rd is initialized to 0, two of the case of the value 7 and the case of the value 15 are set, but in the present embodiment, the value 11 is set. The setting values may be two or more types, or may be controlled by a register or the like.

The operations of the count signal cnt_hpd_rd and the row address signal addr_rd are the same as those in the third embodiment, and therefore description thereof will be omitted.

Figure 18A:
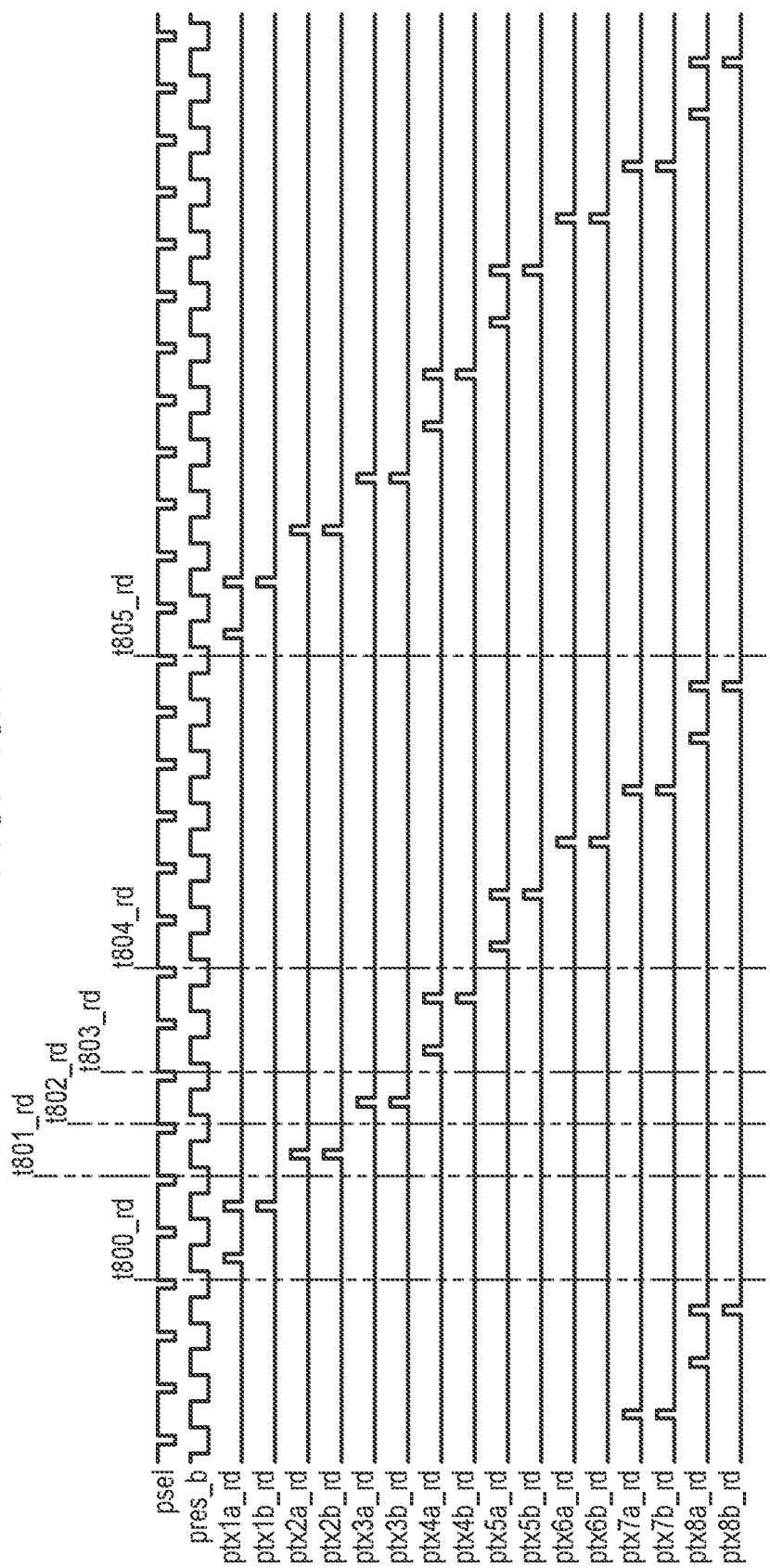
Figure 18C:
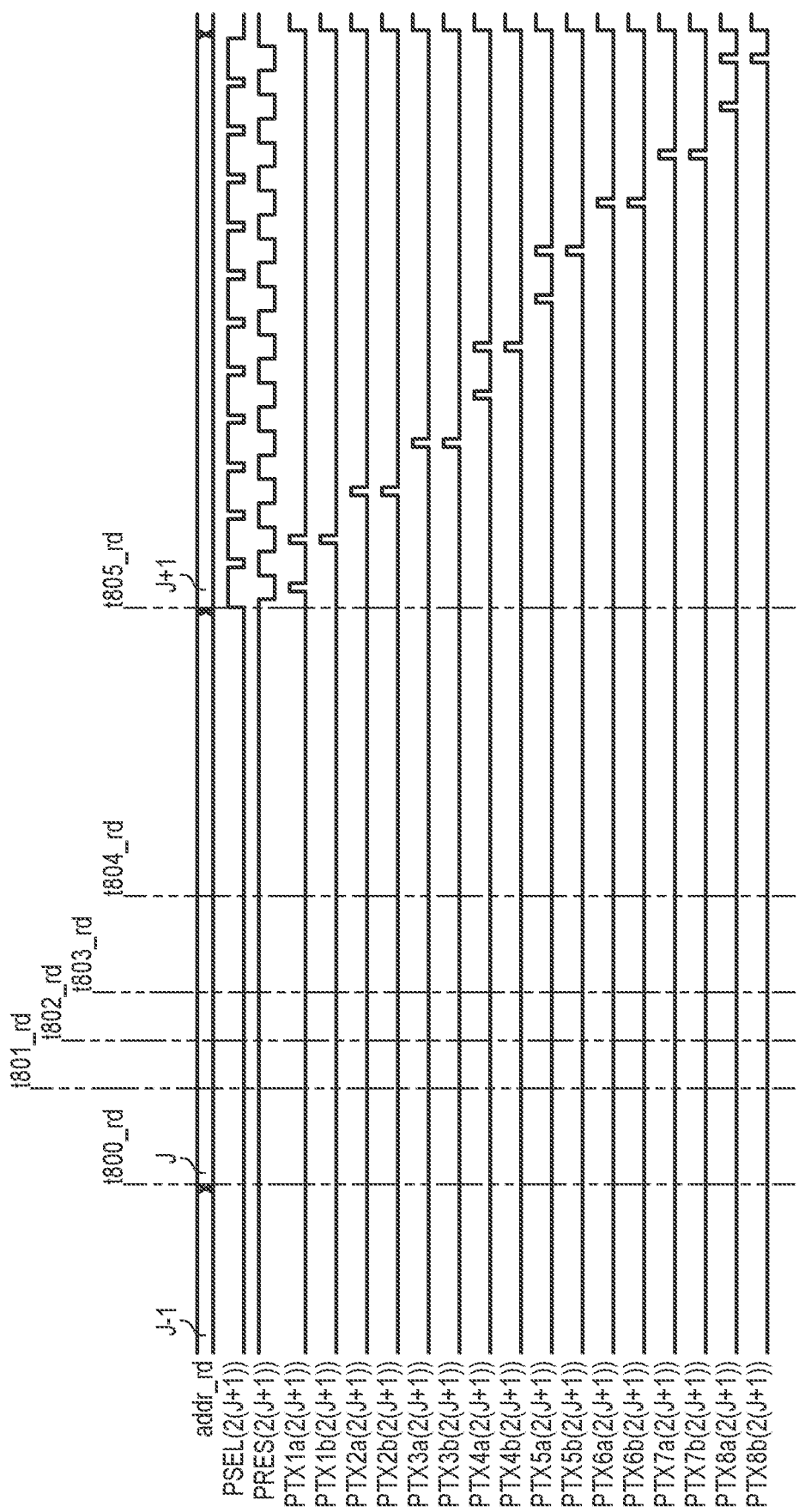

Next, an operation example of the pixel control signal generation unit 324 and the pixel unit 4 in the photoelectric conversion device according to the present embodiment will be described with reference to FIG. 18A to FIG. 18C. FIG. 18A to FIG. 18C are timing charts illustrating an operation example of the pixel control signal generation unit 324 and the pixel unit 4 in the photoelectric conversion device according to the present embodiment. Here, the operation of the pixel control signal generation unit 324 and the pixel unit 4 in the readout processing is described, and the description of the operation of the pixel control signal generation unit 324 and the pixel unit 4 in the reset A processing and the reset B processing is omitted.

It is assumed that the value of the row address signal addr_rd transitions from (J−1) to J at time t800_rd. As a result, the 2J-th row and the (2J−1)-th row of the pixel unit 4 become the target row of the readout processing.

During two Hpd periods from time t800_rd to time t801_rd, the control signal PTX1a is set to the high level to make the transfer transistor M1a conductive, and then the control signals PTX1a and PTX1b are set to the high level to make the transfer transistors M1a and M1b conductive.

During one Hpd period from a subsequent time t801_rd to time t802_rd, the control signals PTX2a and PTX2b are set to the high level to make the transfer transistors M2a and M2b conductive.

During one Hpd period from a subsequent time t802_rd to time t803_rd, the control signals PTX3a and PTX3b are set to the high level to make the transfer transistors M3a and M3b conductive.

During two Hpd periods from a subsequent time t803_rd to time t804_rd, the control signal PTX4a is set to the high level to make the transfer transistor M4a conductive, and then the control signals PTX4a and PTX4b are set to the high level to make the transfer transistors M4a and M4b conductive.

In a subsequent four Hpd periods from time t804_rd to time t805_rd, the transfer transistors M5a and M5b to M8a and M8b are driven in the same manner as in the four Hpd periods from time t800_rd to time t803_rd.

As described above, in the present embodiment, the driving is switched in a staggered grid pattern in units of the photoelectric converters PD. Note that it is not always necessary to switch the driving in a staggered grid manner in units of the photoelectric converters PD, and for example, the driving may be switched in row units of row of the photoelectric converters PD, switched in column units of the photoelectric converters PD, or switched in row units and column units of the photoelectric converters PD.

When the value of the row address signal addr_rd transitions to J+1 at time t805_rd, the (2(J+1))-th row and the (2(J+1)−1)-th row of the pixel unit 4 become the target row of the readout processing.

Thereafter, a vertical scan is performed while performing similar pixel driving.

Figure 19A:
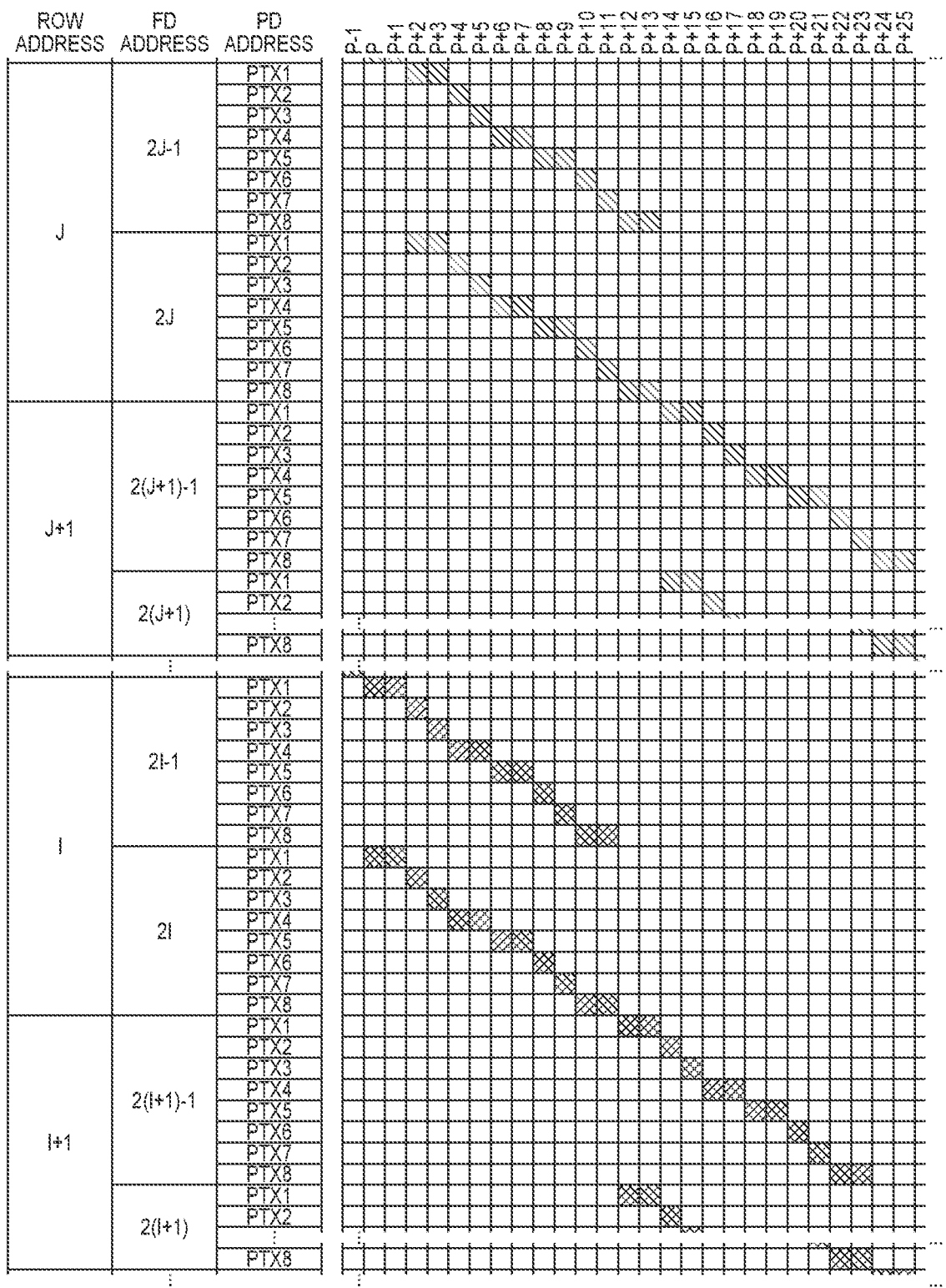
FIG. 19A and FIG. 19B are timing charts illustrating transition of row addresses in a vertical scan of the photoelectric conversion device according to the fourth embodiment of the present invention.
Figure 19B:
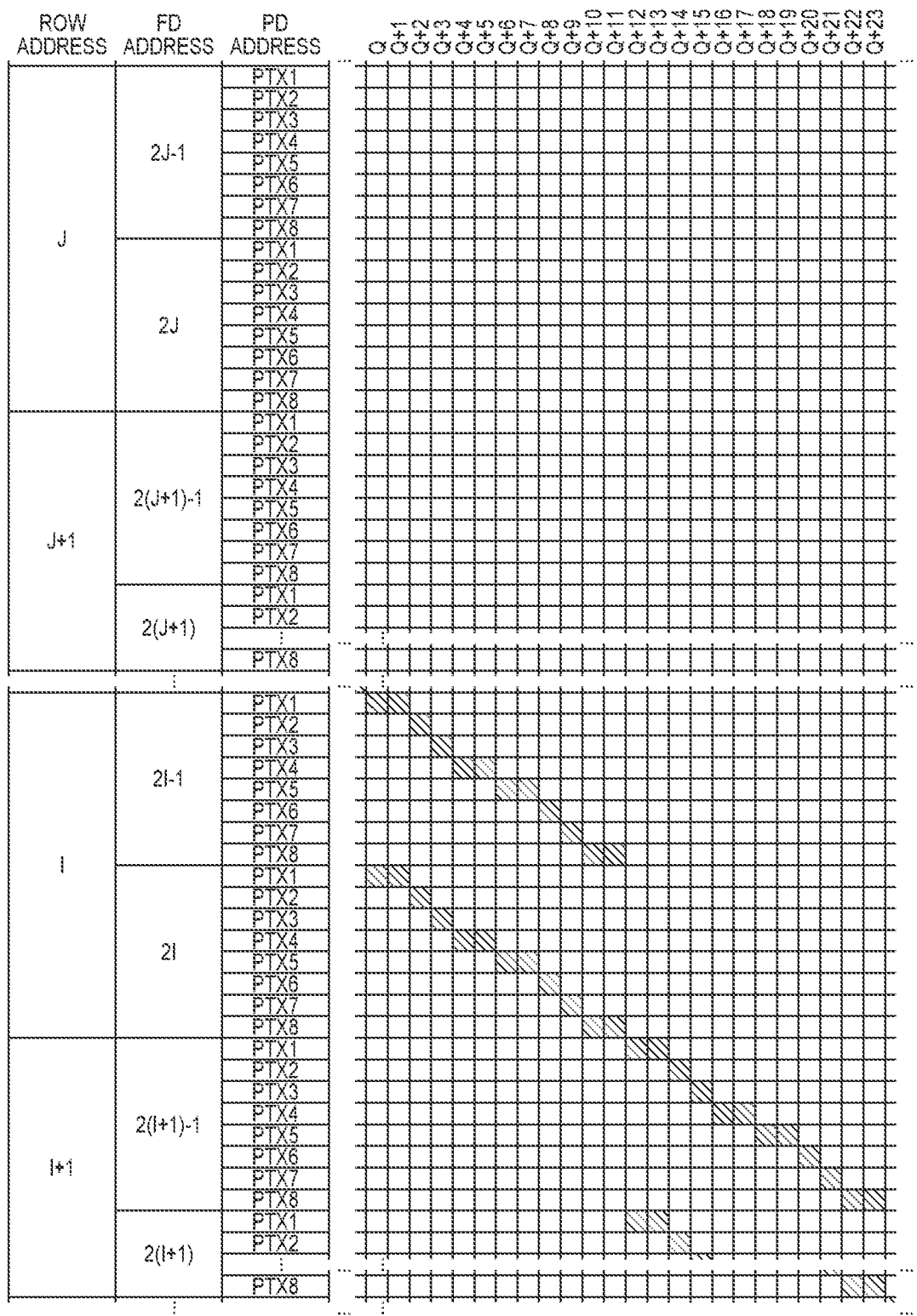

Next, transition of row addresses in a vertical scan of the photoelectric conversion device according to the present embodiment will be described with reference to FIG. 19A and FIG. 19B. FIG. 19A and FIG. 19B are timing charts for explaining transition of row addresses in a vertical scan of the photoelectric conversion device according to the present embodiment. In the present embodiment, as described with reference to FIG. 18A to FIG. 18C, a vertical scan is performed while switching driving in a staggered grid manner in units of PD. The transition of the row address in the vertical scan is the same as that in the third embodiment, and a description thereof will be omitted.

As described above, according to the present embodiment, by changing the operation of the counter that counts the horizontal synchronization signal Hpd, it is possible to realize a vertical scan with a higher degree of freedom in which driving is switched in units of the photoelectric converters PD.

Therefore, according to the present embodiment, the degree of freedom in setting the exposure time may be improved in the photoelectric conversion device including the pixel P including the plurality of photoelectric converters PD sharing the floating diffusion FD.

Fifth Embodiment

Figure 20:
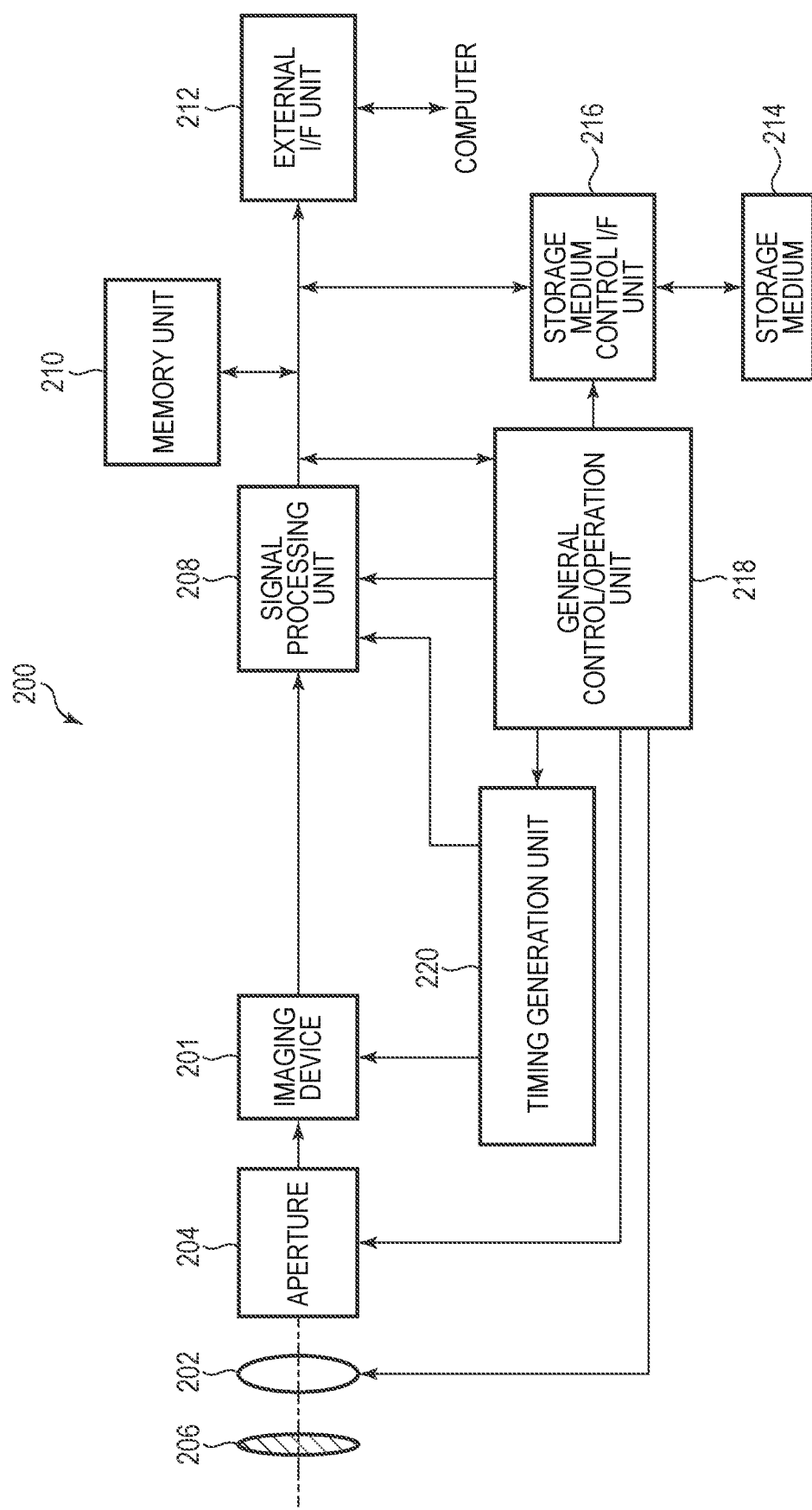
FIG. 20 is a block diagram illustrating a schematic configuration of an imaging system according to a fifth embodiment of the present invention.

An imaging system according to a fifth embodiment of the present invention will be described with reference to FIG. 20. FIG. 20 is a block diagram illustrating a schematic configuration of an imaging system according to the present embodiment.

The photoelectric conversion device 100 described in the first to fourth embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 20 illustrates a block diagram of a digital still camera as an example of them.

The imaging system 200 illustrated in FIG. 20 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 form an optical system for focusing light on the imaging device 201. The imaging device 201 is the photoelectric conversion device 100 described in any of the first to fourth embodiments, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric converter of the imaging device 201 is formed, or may be formed on a semiconductor substrate different from the semiconductor layer on which the photoelectric converter of the imaging device 201 is formed. The signal processing unit 208 may be formed on the same semiconductor substrate as the imaging device 201.

The imaging system 200 further includes a memory unit 210 for temporarily storing image data, and an external interface unit (external I/F unit) 212 for communicating with an external computer or the like. The imaging system 200 further includes a storage medium 214 such as a semiconductor memory for storing or reading out imaging data, and a storage medium control interface unit (storage medium control I/F unit) 216 for storing or reading out imaging data on or from the storage medium 214. The storage medium 214 may be built in the imaging system 200 or may be detachable.

The imaging system 200 further includes a general control/operation unit 218 that controls various calculations and the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, an imaging system to which the photoelectric conversion device 100 according to the first to fourth embodiments is applied can be realized.

Sixth Embodiment

Figure 21A:
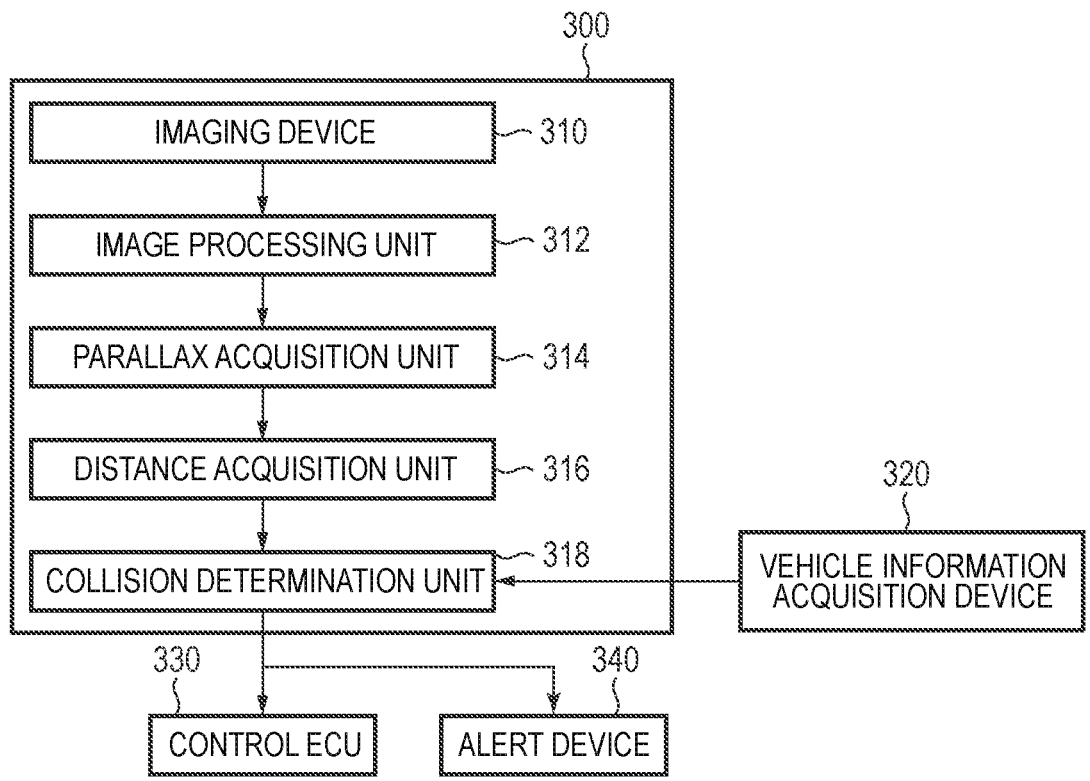
FIG. 21A is a diagram illustrating a configuration example of an imaging system according to a sixth embodiment of the present invention.
Figure 21B:
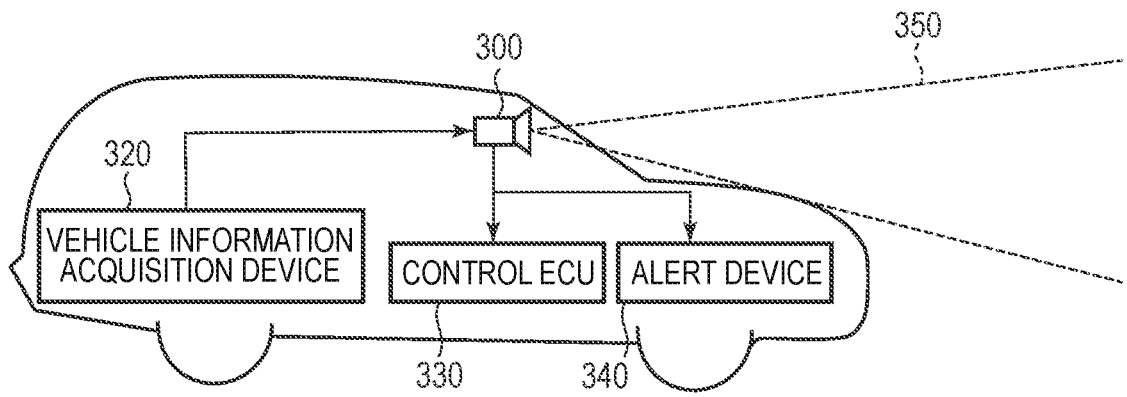
FIG. 21B is a diagram illustrating a configuration example of a movable object according to the sixth embodiment of the present invention.

An imaging system and a movable object according to a sixth embodiment of the present invention will be described with reference to FIG. 21A and FIG. 21B. FIG. 21A is a diagram illustrating a configuration of an imaging system according to the present embodiment. FIG. 21B is a diagram illustrating a configuration of a movable object according to the present embodiment.

FIG. 21A illustrates an example of an imaging system related to an in-vehicle camera. The imaging system 300 includes an imaging device 310. The imaging device 310 is the photoelectric conversion device 100 according to any one of the first to fourth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to an object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to the object, and the like. The collision determination unit 318 may determine the possibility of collision using any of the distance information. The distance information acquisition unit may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alert to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alert information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 21B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the present invention is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (mobile device) such as a ship, an aircraft, or an industrial robot. In addition, the present invention can be applied not only to a movable object but also to equipment using object recognition in a wide range such as an intelligent transport system (ITS).

Seventh Embodiment

Figure 22:
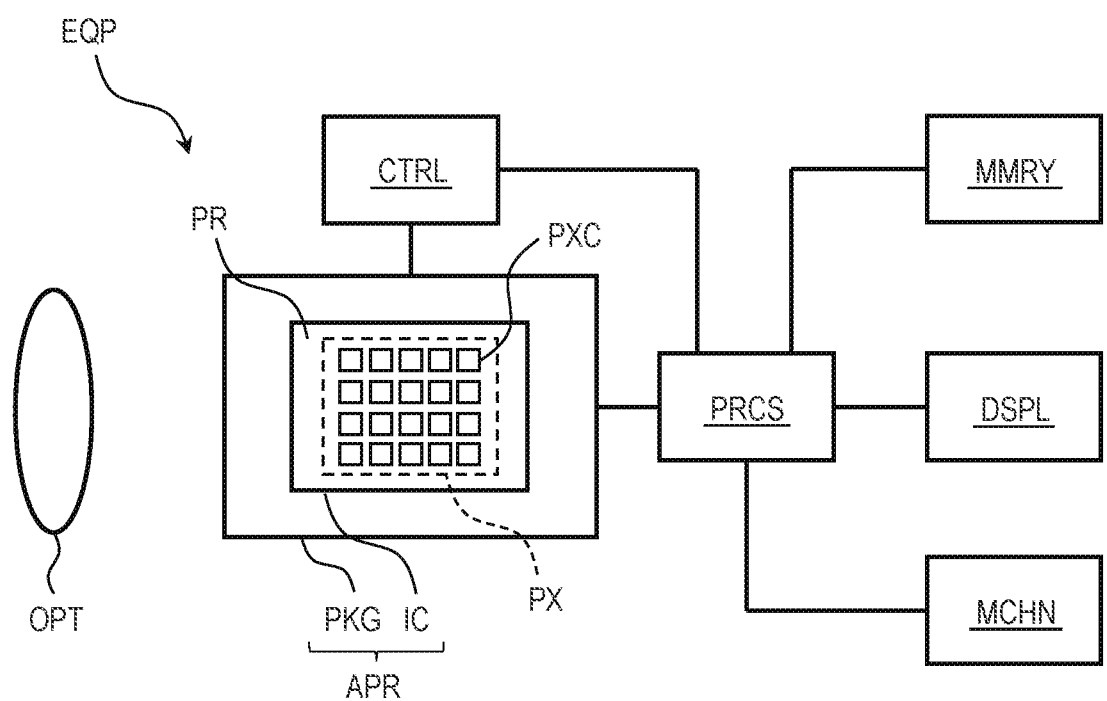
FIG. 22 is a block diagram illustrating a schematic configuration of equipment according to a seventh embodiment of the present invention.

Equipment according to a seventh embodiment of the present invention will be described with reference to FIG. 22. FIG. 22 is a block diagram illustrating a schematic configuration of equipment according to the present embodiment.

FIG. 22 is a schematic diagram illustrating equipment EQP including the photoelectric conversion device APR. The photoelectric conversion device APR has the function of the photoelectric conversion device 100 according to any one of the first to fourth embodiments. All or part of the photoelectric conversion device APR is a semiconductor device IC. The photoelectric conversion device APR of this example may be used as, for example, an image sensor, an AF (Auto Focus) sensor, a photometric sensor, or a distance measuring sensor. The semiconductor device IC has a pixel area PX in which pixel circuits PXC including photoelectric converters are arranged in a matrix. The semiconductor device IC may have a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric converters and a second semiconductor chip provided with peripheral circuits are stacked. Each of the peripheral circuits in the second semiconductor chip may be a column circuit corresponding to a pixel column of the first semiconductor chip. The peripheral circuits in the second semiconductor chip may be matrix circuits corresponding to pixels or pixel blocks of the first semiconductor chip. As the connection between the first semiconductor chip and the second semiconductor chip, an inter-chip interconnection by direct bonding of a through electrode (TSV) and a conductor such as copper, a connection by microbumps between chips, a connection by wire bonding, or the like may be employed.

The photoelectric conversion device APR may include, in addition to the semiconductor device IC, a package PKG accommodating the semiconductor device IC. The package PKG may include a base body to which the semiconductor device IC is fixed, a lid body such as glass facing the semiconductor device IC, and a connecting member such as a bonding wire or a bump connecting a terminal provided on the base body and a terminal provided on the semiconductor device IC.

The equipment EQP may further include at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is a semiconductor device such as an ASIC. The processing device PRCS processes a signal output from the photoelectric conversion device APR, and constitutes an AFE (analog front end) or a DFE (digital front end). The processing device PRCS is a semiconductor device such as a central processing unit (CPU) or an application specific integrated circuit (ASIC). The display device DSPL is an EL display device or a liquid crystal display device that displays information (image) obtained by the photoelectric conversion device APR. The storage device MMRY is a magnetic device or a semiconductor device that stores information (image) obtained by the photoelectric conversion device APR. The storage device MMRY is a volatile memory such as an SRAM or a DRAM, or a nonvolatile memory such as a flash memory or a hard disk drive. The mechanical device MCHN has a movable portion or a propulsion portion such as a motor or an engine. In the equipment EQP, a signal output from the photoelectric conversion device APR is displayed on the display device DSPL, or transmitted to the outside by a communication device (not illustrated) included in the equipment EQP. To this end, the equipment EQP preferably further includes a storage device MMRY and a processing device PRCS in addition to a storage circuit unit and an arithmetic circuit unit included in the photoelectric conversion device APR.

Figure 14:
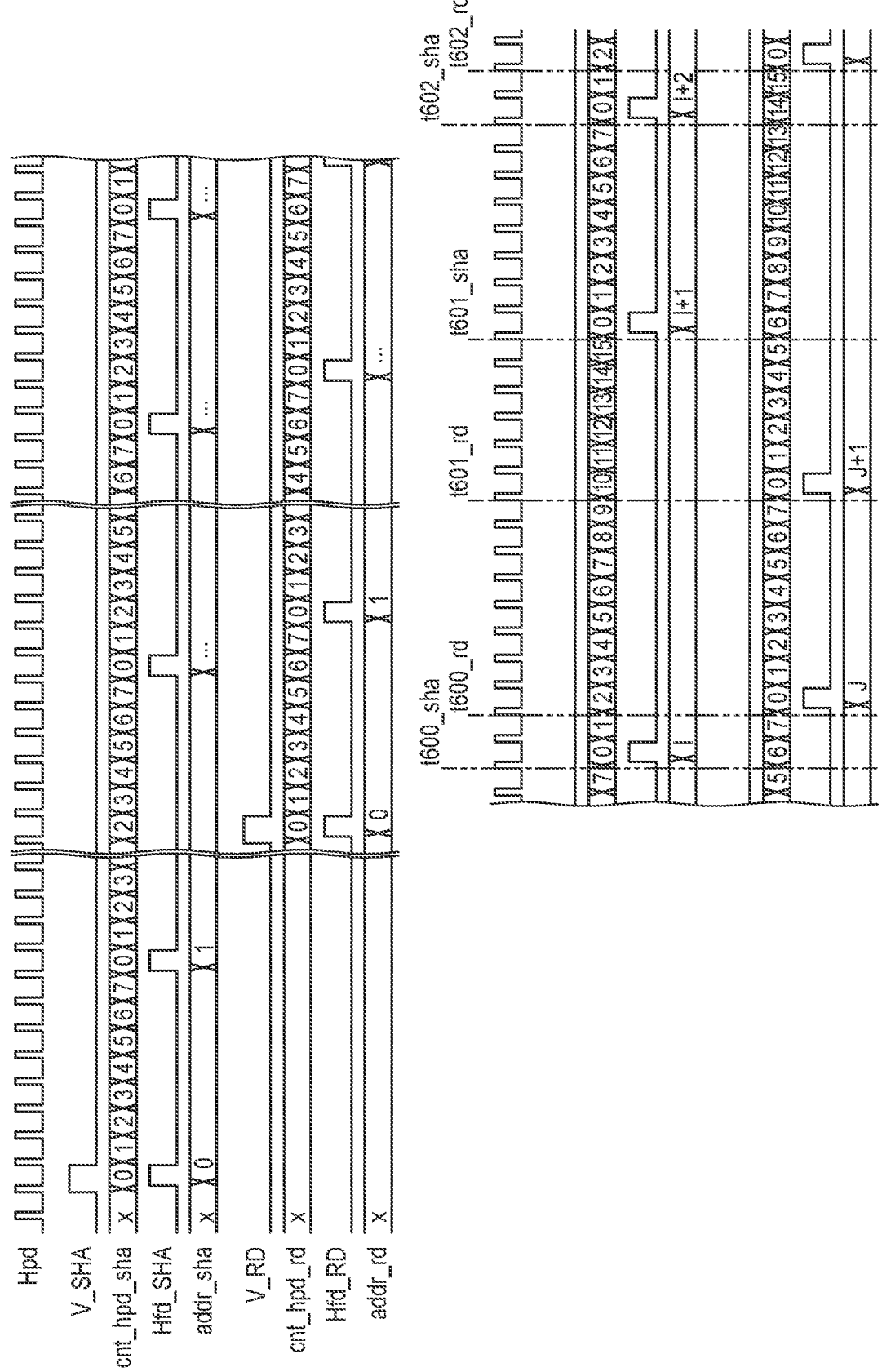
FIG. 14 is a timing chart illustrating an operation example of a readout row/reset row address generation unit in the photoelectric conversion device according to the third embodiment of the present invention.

The equipment EQP illustrated in FIG. 14 may be an electronic device such as an information terminal (e.g., a smartphone or a wearable terminal) having a photographing function or a camera (For example, an interchangeable lens camera, a compact camera, a video camera, and a surveillance camera.). The mechanical device MCHN in the camera may drive components of the optical device OPT for zooming, focusing, and shutter operations. The equipment EQP may be a transportation equipment (movable object) such as a vehicle, a ship, or an airplane. The equipment EQP may be a medical device such as an endoscope or a CT scanner. The equipment EQP may be a medical device such as an endoscope or a CT scanner.

The mechanical device MCHN in the transport device may be used as a mobile device. The equipment EQP as a transport device is suitable for transporting the photoelectric conversion device APR or for assisting and/or automating driving (steering) by an imaging function. The processing device PRCS for assisting and/or automating driving (steering) can perform processing for operating the mechanical device MCHN as the mobile device based on information obtained by the photoelectric conversion device APR.

The photoelectric conversion device APR according to the present embodiment can provide a high value to the designer, the manufacturer, the seller, the purchaser, and/or the user. Therefore, when the photoelectric conversion device APR is mounted on the equipment EQP, the value of the equipment EQP may be increased. Therefore, when the equipment EQP is manufactured and sold, determining the mounting of the photoelectric conversion device APR of the present embodiment on the equipment EQP is advantageous in increasing the value of the equipment EQP.

Modified Embodiments

The present invention is not limited to the above embodiments, and various modifications are possible.

For example, an example in which a configuration of a part of any embodiment is added to another embodiment or an example in which a configuration of a part of another embodiment is substituted is also an embodiment of the present invention.

The configuration of the pixel P illustrated in FIG. 2 and FIG. 3 is merely an example, and the present invention is not limited thereto. For example, the number of photoelectric converters PD sharing one floating diffusion FD is not limited to eight or sixteen, and may be changed as appropriate. Two or more of the photoelectric converters PD sharing one floating diffusion FD may share a microlens. The present invention is particularly useful in a photoelectric conversion device including three or more pixels P in which one floating diffusion FD is shared by photoelectric converters PD.

The imaging systems described in the fifth and sixth embodiments are examples of an imaging system to which the photoelectric conversion device of the present invention may be applied, and the imaging system to which the photoelectric conversion device of the present invention may be applied is not limited to the configurations illustrated in FIG. 20 and FIG. 21A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076563, filed Apr. 28, 2021 which is hereby incorporated by reference herein in its entirety.

What is claimed is:

1. A photoelectric conversion device comprising:
a pixel unit in which a plurality of pixels each including three or more photoelectric converters, a floating diffusion to which charges of the plurality of photoelectric converters are transferred, and an output unit that outputs a signal corresponding to a voltage of the floating diffusion are arranged so as to form a plurality of rows and a plurality of columns;
a vertical scanning unit that performs a readout processing for reading out a signal of the pixel and a reset processing for resetting the pixel on the plurality of pixels arranged in the pixel unit while switching the photoelectric converter to be processed and the floating diffusion to be processed; and
a control unit configured to control the vertical scanning unit,
wherein the control unit includes a readout row address generation unit that generates a row address of a pixel from which a signal is readout during the readout processing and outputs the row address to the vertical scanning unit, and a reset row address generation unit that generates a row address of a pixel to be reset during the reset processing and outputs the row address to the vertical scanning unit,
wherein a first cycle, which is a cycle in which the photoelectric converter to be processed is switched during the readout processing and the reset processing, is shorter than a second cycle, which is a cycle in which the floating diffusion to be processed is switched during the readout processing and the reset processing,
wherein each of an update cycle of the row address in the readout row address generation unit and an update cycle of the row address in the reset row address generation unit is equal to the second cycle, and
wherein each of a setting unit of an update timing of the row address in the readout row address generation unit and a setting unit of an update timing of the row address in the reset row address generation unit is equal to a length of one cycle of the first cycle.

2. The photoelectric conversion device according to claim 1,
wherein the control unit further includes a readout counter in which a count value transitions in the first cycle and a reset counter in which a count value transitions in the first cycle,
wherein an update timing of the row address in the readout row address generation unit is controlled in accordance with a count value of the readout counter, and
wherein an update timing of the row address in the reset row address generation unit is controlled in accordance with a count value of the reset counter.

3. The photoelectric conversion device according to claim 1,
wherein the control unit further includes a counter in which a count value transitions in the first cycle,
wherein an update timing of the row address in the readout row address generation unit is controlled in accordance with a count value of the counter and a first set value, and
wherein an update timing of the row address in the reset row address generation unit is controlled in accordance with a count value of the counter and a second set value.

4. The photoelectric conversion device according to claim 1, wherein each of the readout row address generation unit and the reset row address generation unit has a plurality of set values that define update timing of the row address.

5. The photoelectric conversion device according to claim 1,
wherein the plurality of rows includes a first row and a second row to be subjected to the readout processing and the reset processing, and
wherein the second cycle in the first row is different from the second cycle in the second row.

6. The photoelectric conversion device according to claim 5,
wherein the plurality of photoelectric converters includes a first set including a first photoelectric converter and a second photoelectric converter, and a second set including a third photoelectric converter and a fourth photoelectric converter,
wherein signals output from the first row include a signal based on a charge generated by the first photoelectric converter, a signal based on a charge generated by the first photoelectric converter and a charge generated by the second photoelectric converter, a signal based on a charge generated by the third photoelectric converter, and a signal based on a charge generated by the third photoelectric converter and a charge generated by the fourth photoelectric converter, and
wherein signals output from the second row include a signal based on a charge generated by the first photoelectric converter and a charge generated by the second photoelectric converter, and a signal based on a charge generated by the third photoelectric converter and a charge generated by the fourth photoelectric converter.

7. The photoelectric conversion device according to claim 1,
wherein the plurality of photoelectric converters includes a first set including a first photoelectric converter and a second photoelectric converter, and a second set including a third photoelectric converter and a fourth photoelectric converter, and
wherein the number of signals based on the first set output during one cycle of the second cycle is greater than the number of signals based on the second set output during one cycle of the second cycle.

8. The photoelectric conversion device according to claim 7,
wherein signals output from the first set include a signal based on a charge generated by the first photoelectric converter and a signal based on a charge generated by the first photoelectric converter and a charge generated by the second photoelectric converter, and
wherein signals output from the second set include a signal based on a charge generated by the third photoelectric converter and a charge generated by the fourth photoelectric converter.

9. The photoelectric conversion device according to claim 6, wherein each of the first set and the second set shares one microlens.

10. The photoelectric conversion device according to claim 1,
wherein the reset row address generation unit includes a first reset row address generation unit and a second reset row address generation unit, and
wherein an update timing of the row address in the first reset row address generation unit is different from an update timing of the row address in the second reset row address generation unit.

11. The photoelectric conversion device according to claim 1,
wherein a plurality of output lines is arranged in each of the plurality of columns, and
wherein the plurality of output lines includes a first output line from which a signal of a pixel arranged in a first row is output, and a second output line from which a signal of a pixel arranged in a second row is output.

12. An imaging system comprising:
the photoelectric conversion device according to claim 1; and
a signal processing unit that processes a signal output from the photoelectric conversion device.

13. A movable object comprising:
the photoelectric conversion device according to claim 1;
a distance information acquiring unit configured to acquire distance information to an object from a parallax image based on a signal from the photoelectric conversion device; and
a control unit configured to control the movable object based on the distance information.

14. Equipment comprising:
the photoelectric conversion device according to claim 1, and
at least one of
an optical device corresponding to the photoelectric conversion device,
a control device configured to control the photoelectric conversion device,
a processing device configured to process a signal output from the photoelectric conversion device,
a mechanical device that is controlled based on information obtained by the photoelectric conversion device,
a display device configured to display information obtained by the photoelectric conversion device, and
a storage device configured to store information obtained by the photoelectric conversion device.

* * * * *